Figure 3:
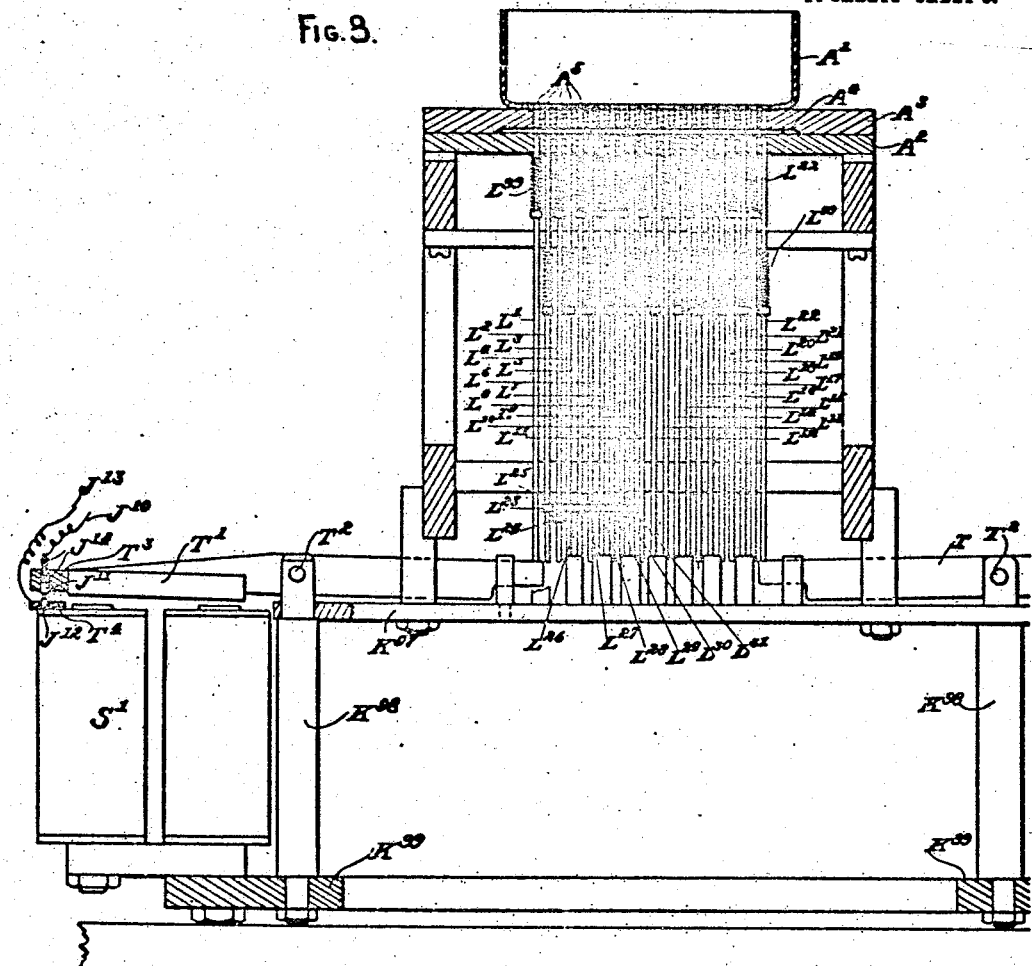

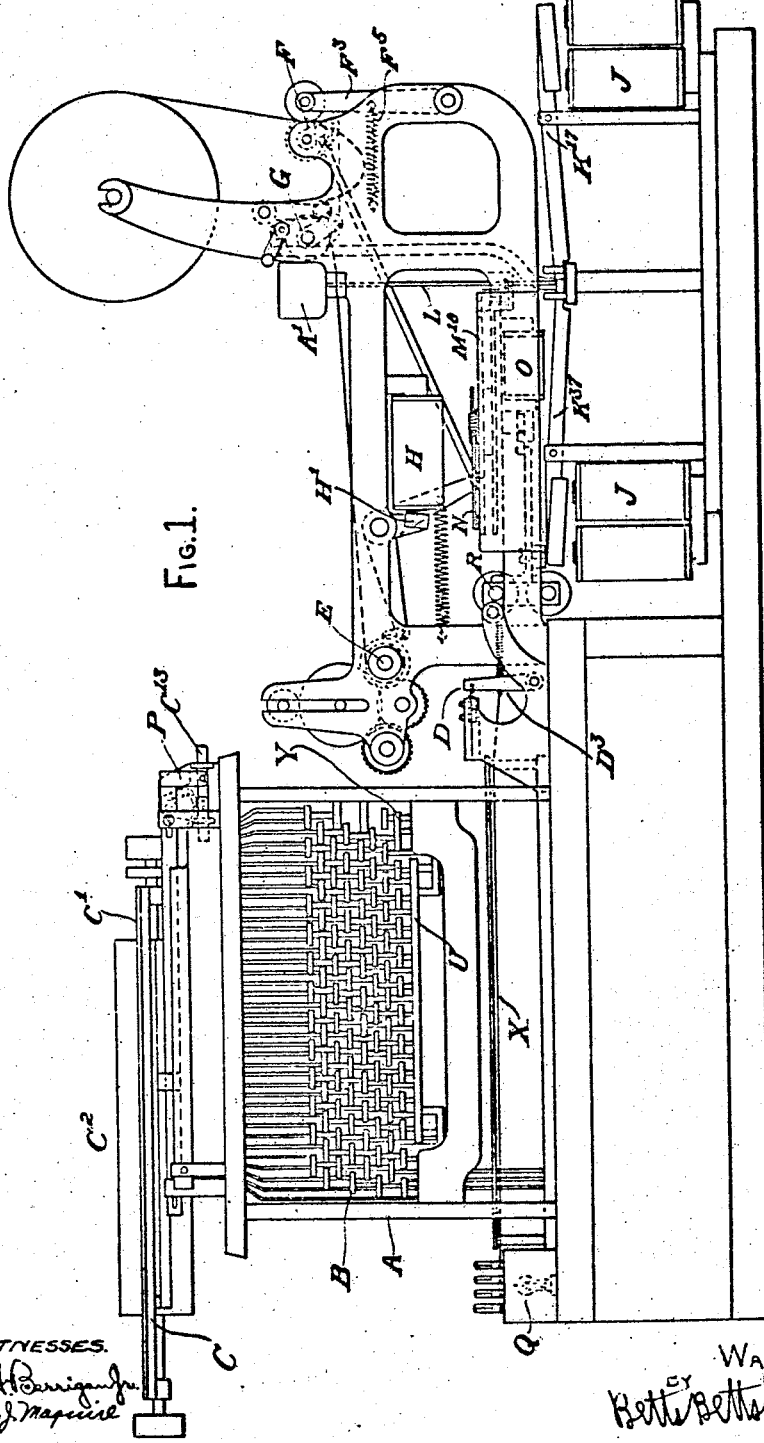

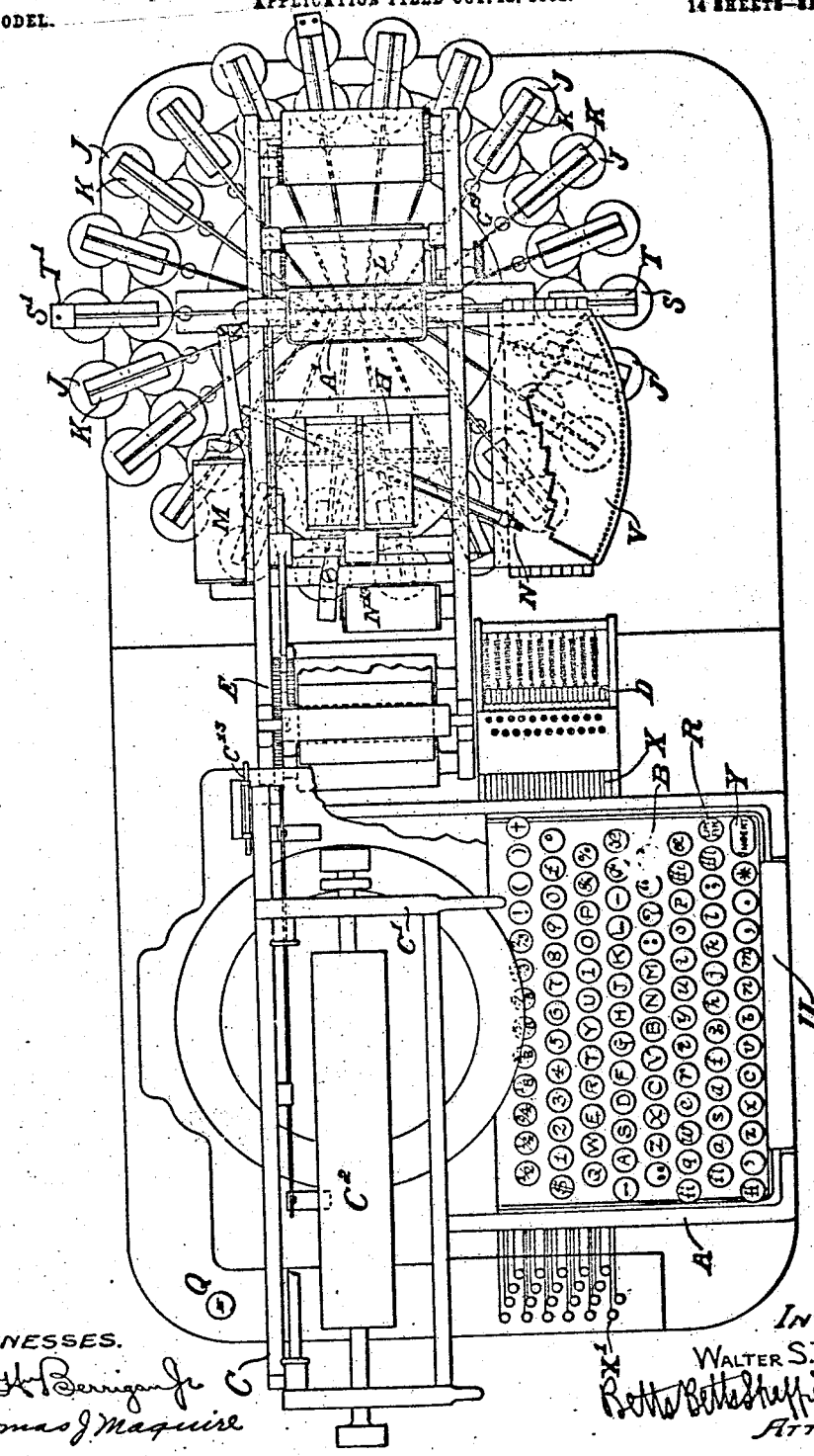

No. 742,523. PATENTED OCT. 27, 1903.
W. S. TIMMIS.
MACHINE FOR PRODUCING CONTROLLERS FOR PRINTING,
TYPE CASTING, &c.
APPLICATION FILED OCT. 12, 1901.
NO MODEL. 14 SHEETS—SHEET 3.
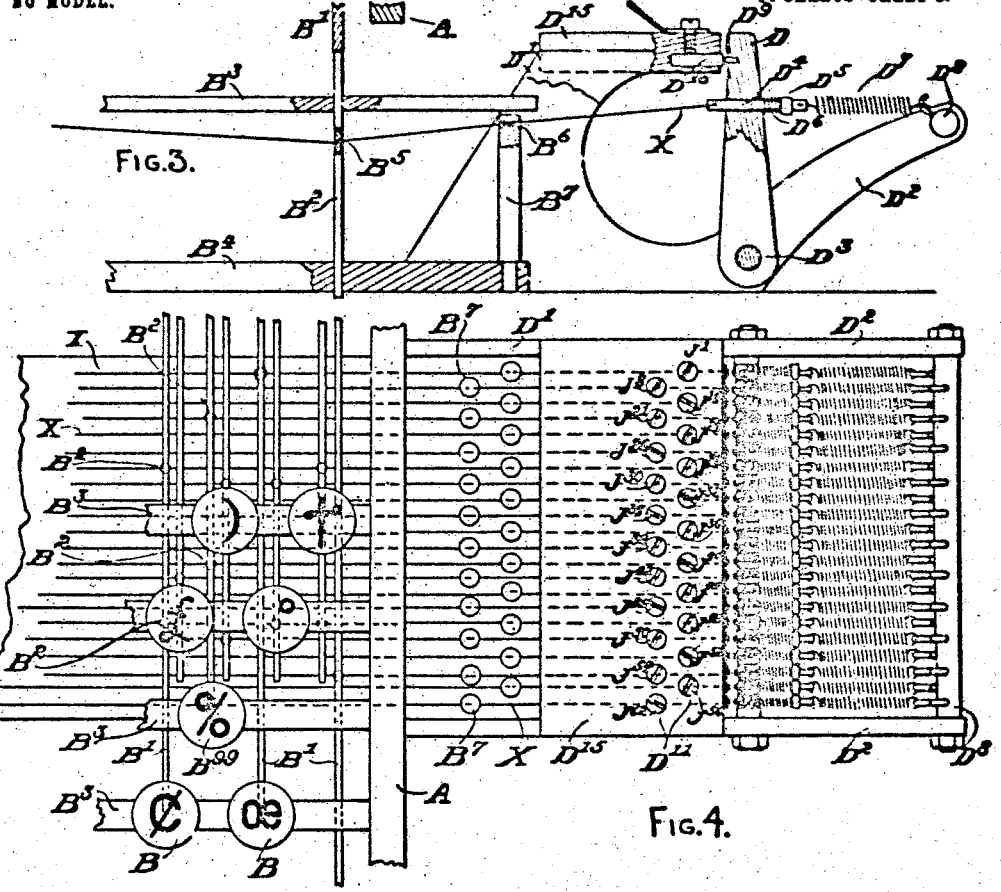

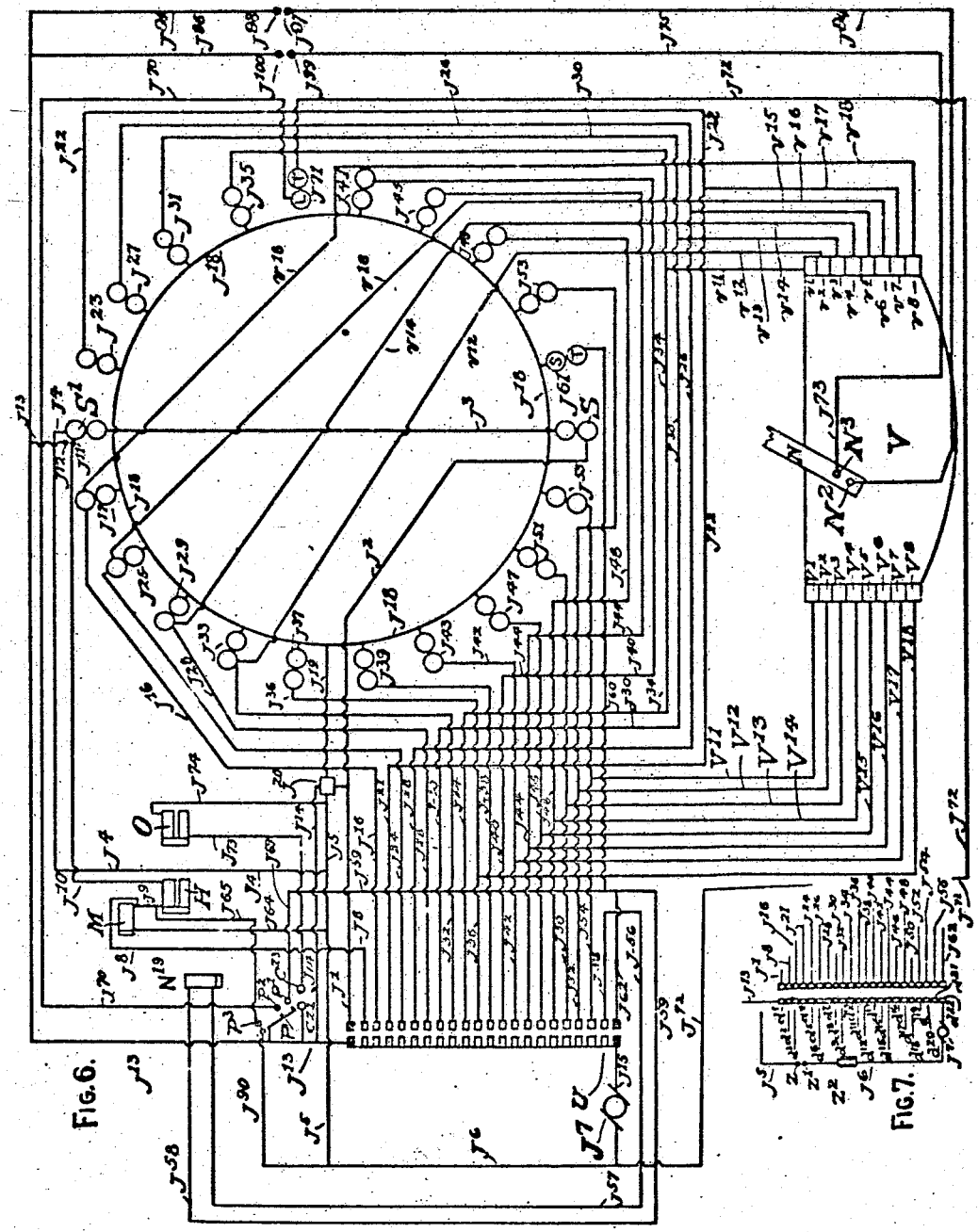

No. 742,523. PATENTED OCT. 27, 1903.
W. S. TIMMIS.
MACHINE FOR PRODUCING CONTROLLERS FOR PRINTING, TYPE CASTING, &c.
APPLICATION FILED OCT. 12, 1901.
NO MODEL. 14 SHEETS—SHEET 5.

WITNESSES
INVENTOR
WALTER S. TIMMIS
ATTORNEYS

No. 742,523. PATENTED OCT. 27, 1903.
W. S. TIMMIS.
MACHINE FOR PRODUCING CONTROLLERS FOR PRINTING, TYPE CASTING, &c.
APPLICATION FILED OCT. 12, 1901.
NO MODEL. 14 SHEETS—SHEET 6.
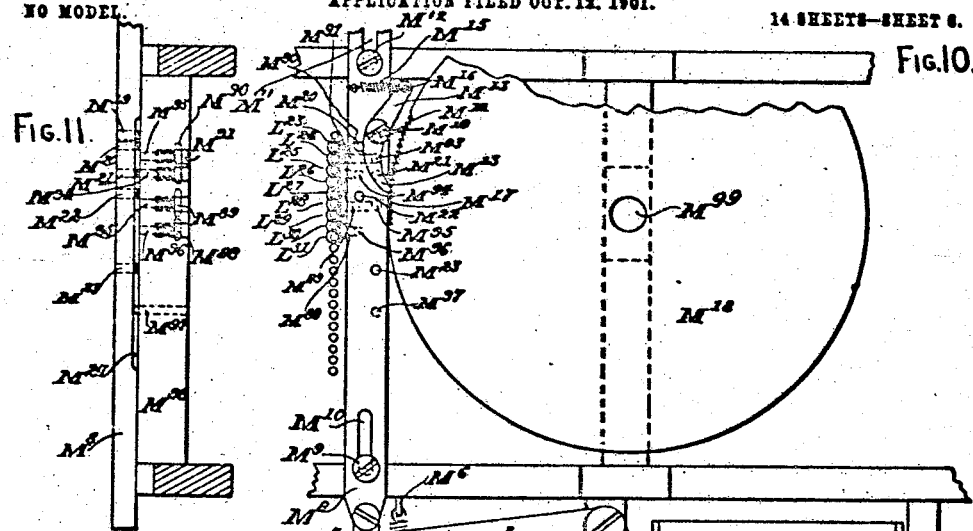
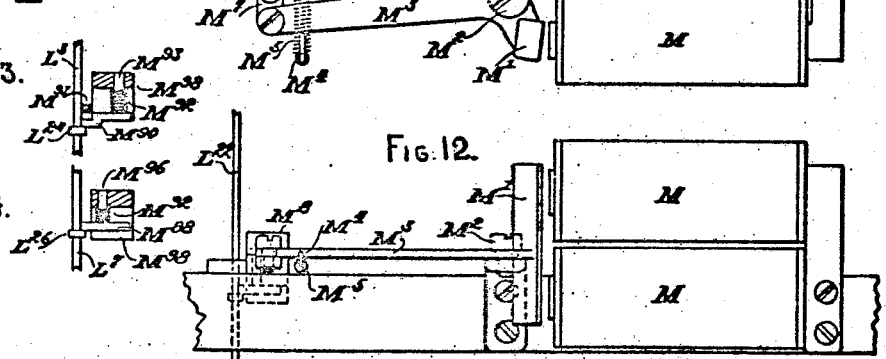
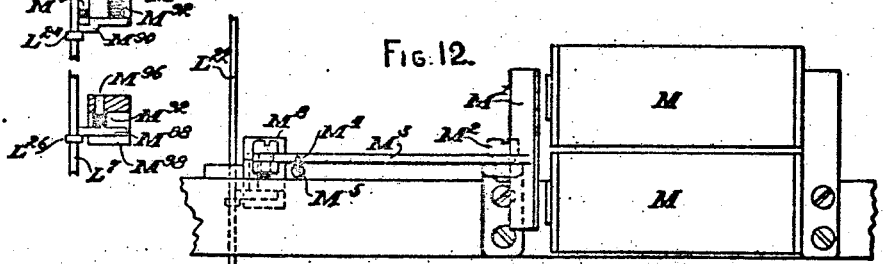
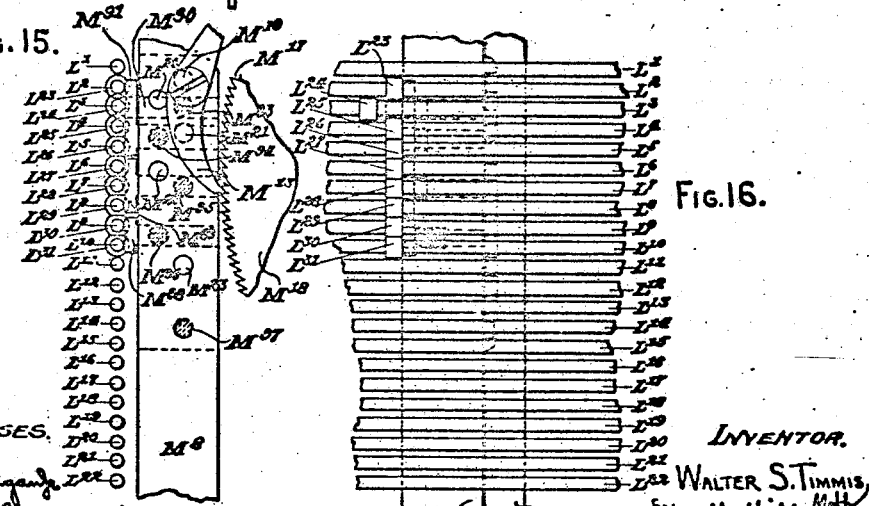
WITNESSES.
INVENTOR.
Walter S. Timmis,
ATTORNEYS.

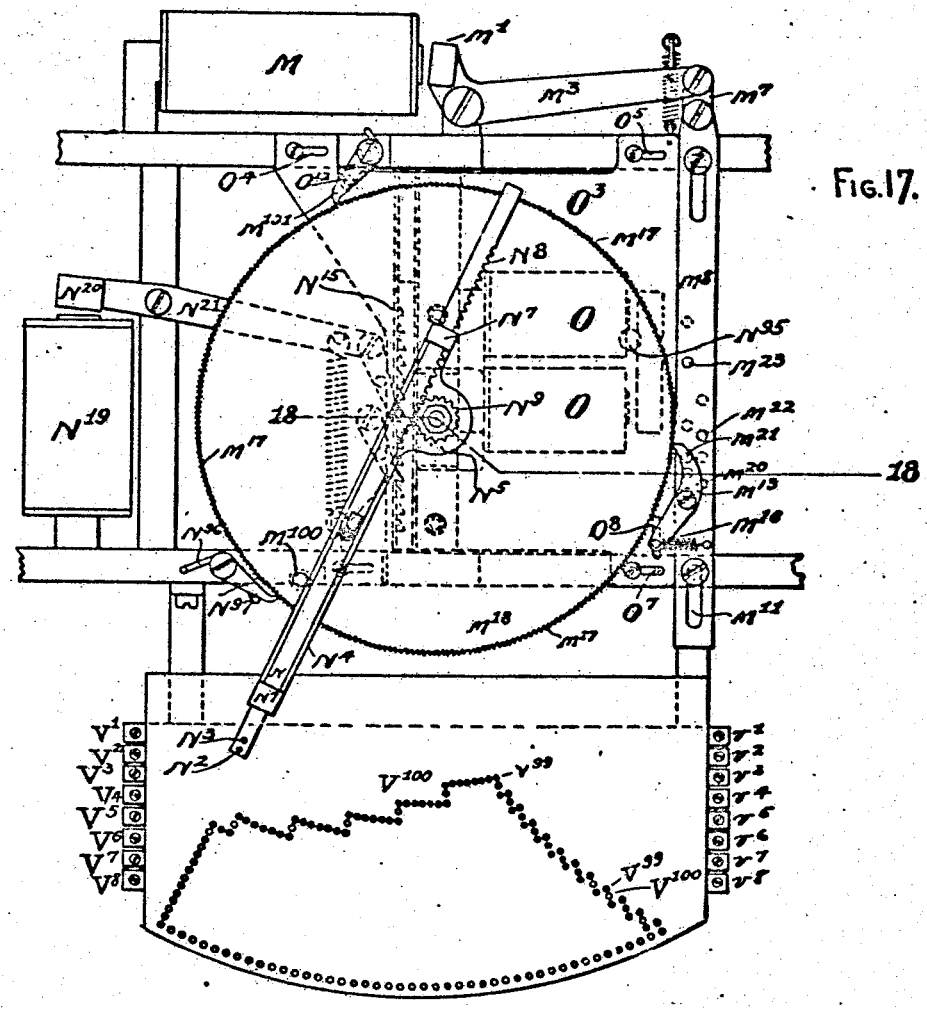

No. 742,523. PATENTED OCT. 27, 1903.
W. S. TIMMIS.
MACHINE FOR PRODUCING CONTROLLERS FOR PRINTING,
TYPE CASTING, &c.
APPLICATION FILED OCT. 12, 1901.
NO MODEL. 14 SHEETS—SHEET 8.

WITNESSES.
INVENTOR
WALTER S. TIMMIS, by
Betts Betts Sheffield Betts
ATTORNEYS.

No. 742,523. PATENTED OCT. 27, 1903.
W. S. TIMMIS.
MACHINE FOR PRODUCING CONTROLLERS FOR PRINTING, TYPE CASTING, &c.
APPLICATION FILED OCT. 12, 1901.
NO MODEL. 14 SHEETS—SHEET 9.
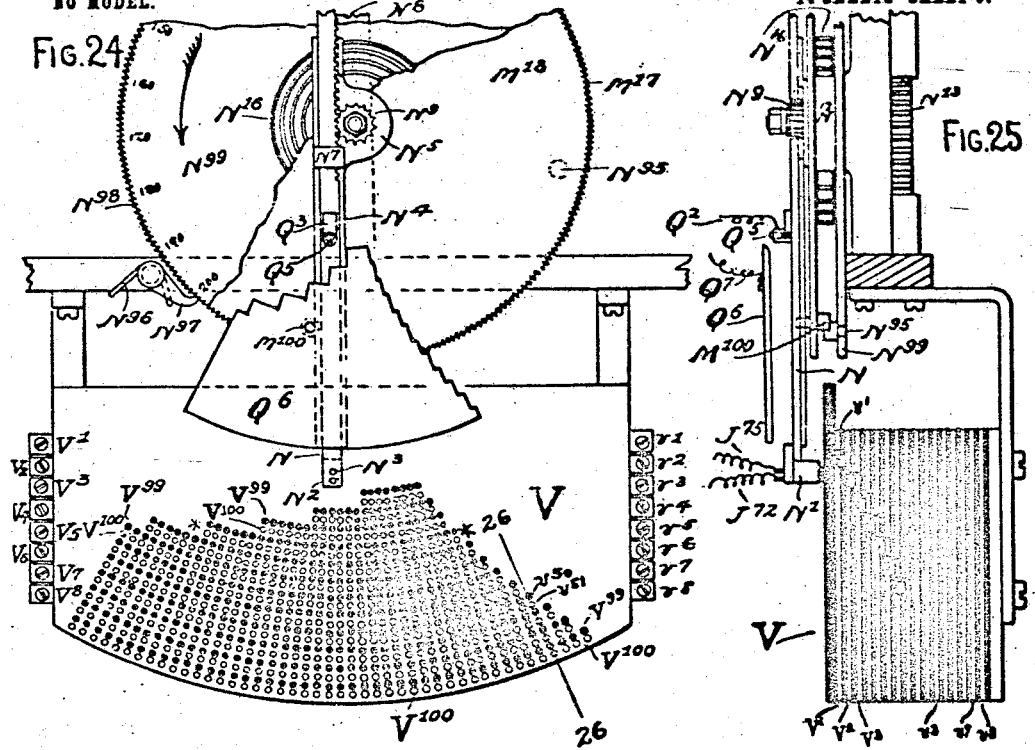
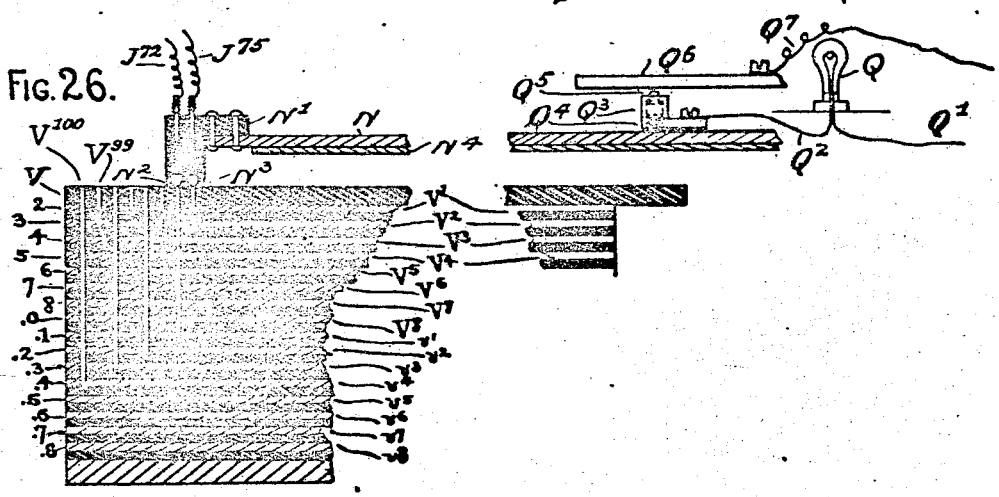
WITNESSES. INVENTOR.
Walter S. Timmis, by
ATTORNEYS.

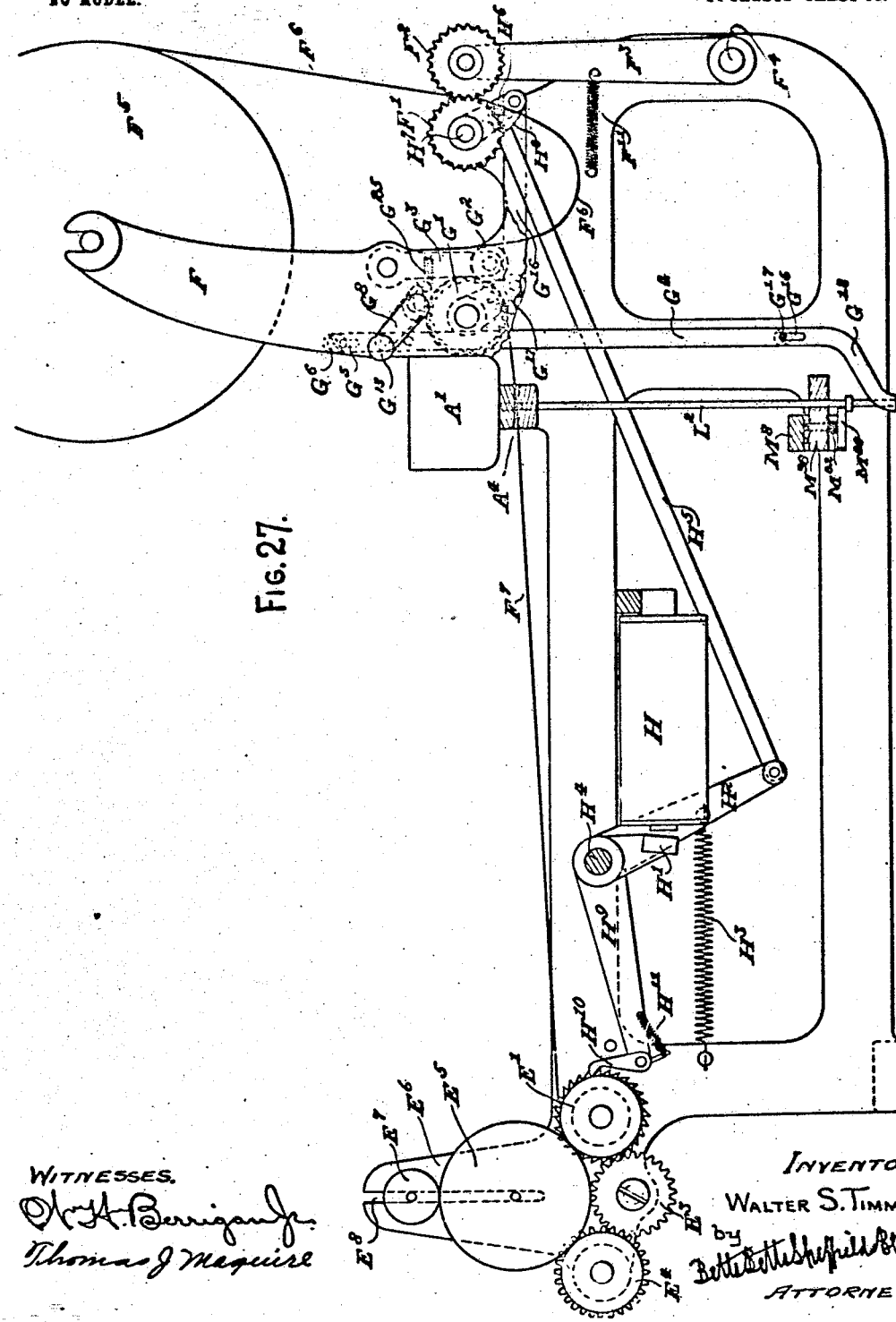

No. 742,523. PATENTED OCT. 27, 1903.
W. S. TIMMIS.
MACHINE FOR PRODUCING CONTROLLERS FOR PRINTING,
TYPE CASTING, &c.
APPLICATION FILED OCT. 12, 1901.
NO MODEL. 14 SHEETS—SHEET 11.
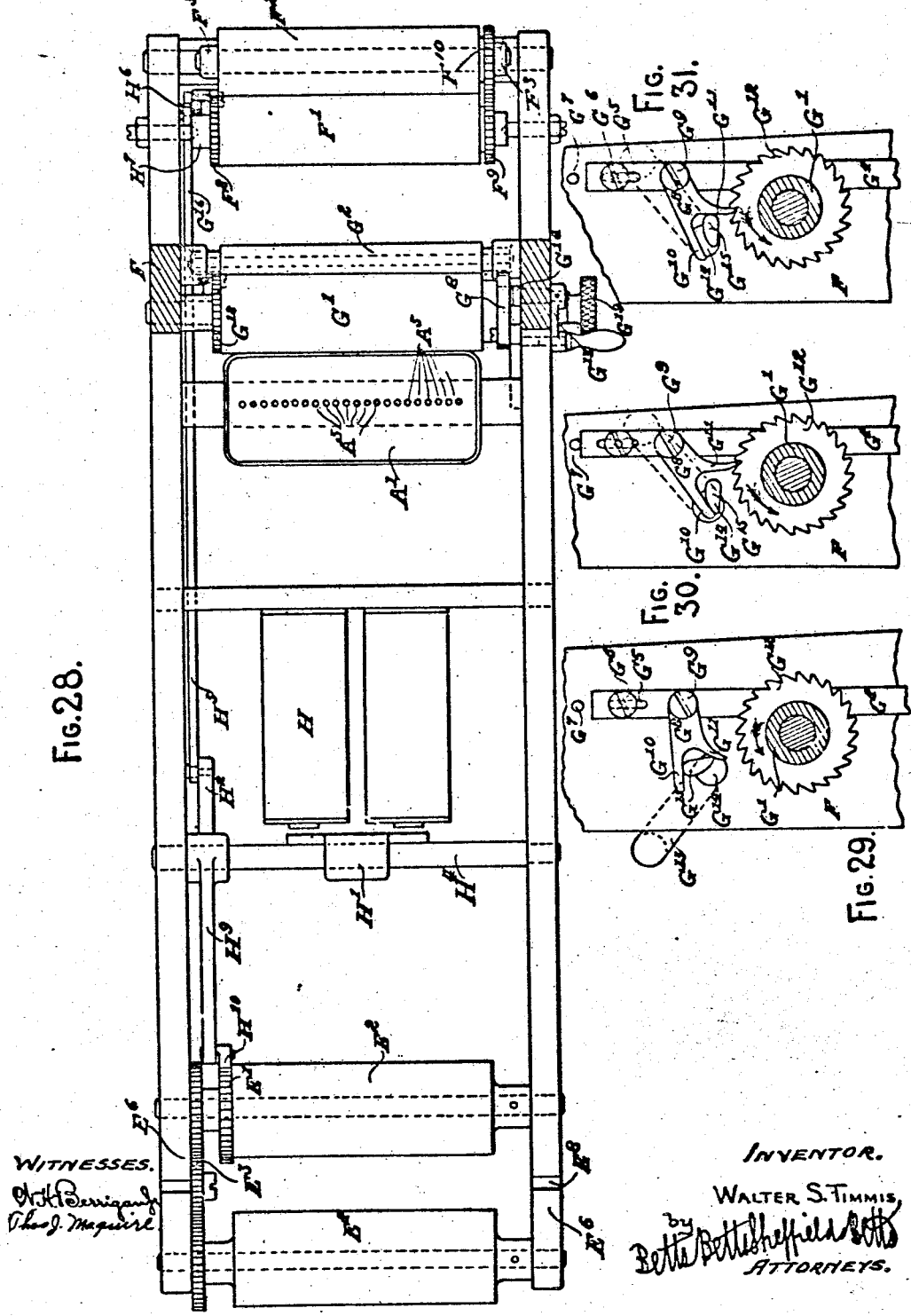

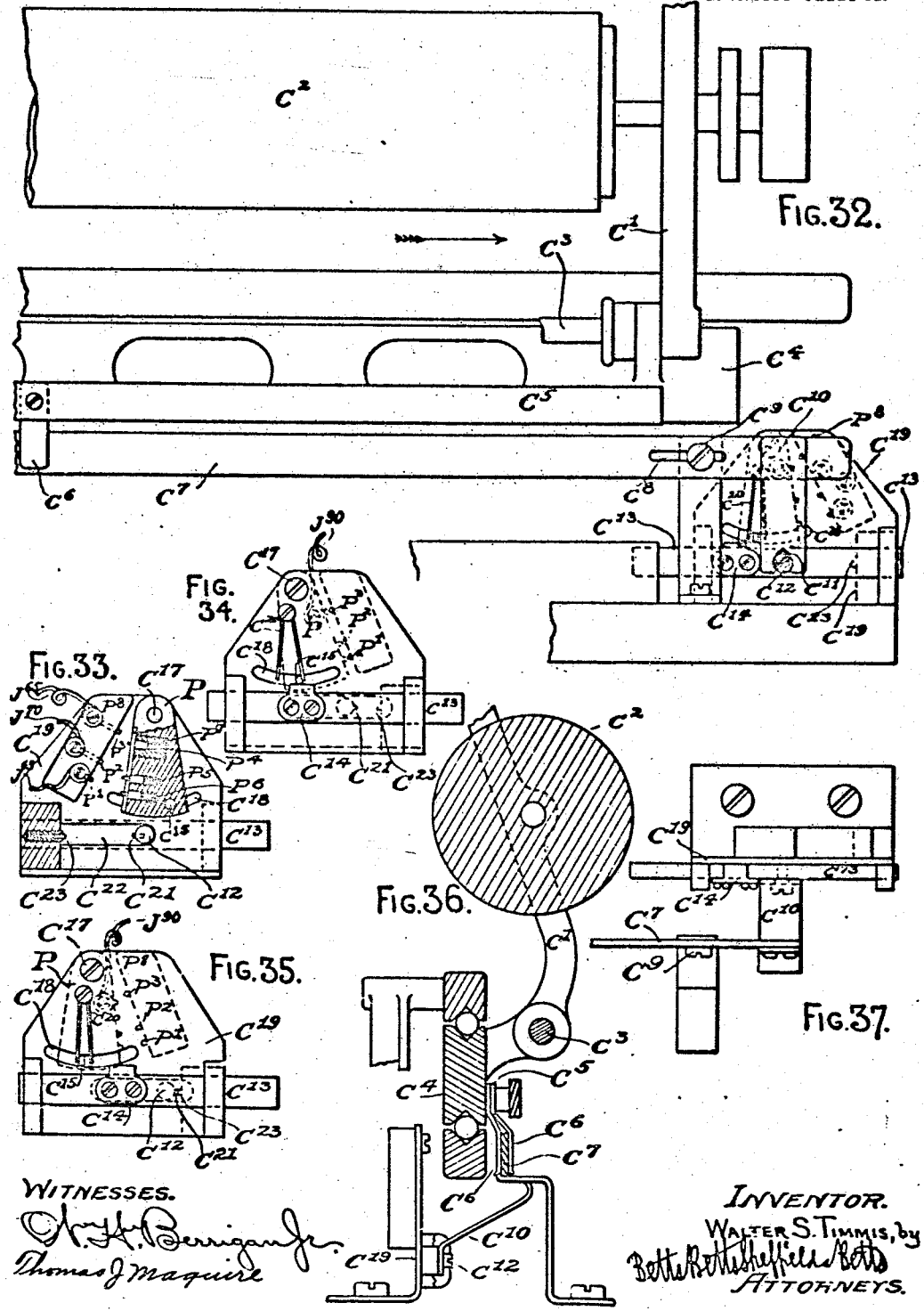

No. 742,523. PATENTED OCT. 27, 1903.
W. S. TIMMIS.
MACHINE FOR PRODUCING CONTROLLERS FOR PRINTING,
TYPE CASTING, &c.
APPLICATION FILED OCT. 12, 1901.
NO MODEL. 14 SHEETS—SHEET 13.

WITNESSES.
INVENTOR.
WALTER S. TIMMIS
by Betts Betts Sheffield Betts
ATTORNEYS.

No. 742,523. PATENTED OCT. 27, 1903.
W. S. TIMMIS.
MACHINE FOR PRODUCING CONTROLLERS FOR PRINTING,
TYPE CASTING, &c.
APPLICATION FILED OCT. 12, 1901.
NO MODEL. 14 SHEETS—SHEET 14.

WITNESSES
INVENTOR
WALTER S. TIMMIS,
ATTORNEYS.

No. 742,523.

Patented October 27, 1903.

UNITED STATES PATENT OFFICE.

WALTER S. TIMMIS, OF BROOKLYN, NEW YORK.

MACHINE FOR PRODUCING CONTROLLERS FOR PRINTING, TYPE-CASTING, &c.

SPECIFICATION forming part of Letters Patent No. 742,523, dated October 27, 1903.

Application filed October 12, 1901. Serial No. 78,413. (No model.)

*To all whom it may concern:*

Be it known that I, WALTER S. TIMMIS, a citizen of the United States, residing in the borough of Brooklyn, in the city and State of New York, (whose post-office address is 703 Decatur street, in said borough,) have invented certain new and useful Improvements in Machines for Producing Controllers for Printing, Type-Casting, Type-Setting, &c., of which the following is a full and true description.

The object of my invention is to provide an improved machine for producing controllers adapted to control the operation of a machine for printing or type-casting or type-setting or for other purposes; and the improvements especially consist in providing controller-producing machines with new combinations, whereby operations which were prior to my invention performed by the operator are automatically performed by the machine and with far greater accuracy than heretofore. Principal among these improvements is a combination of parts whereby the machine automatically selects one or more devices operating to provide a controller (a strip of paper, for instance,) with perforations or other means for representing the justification of a printed, cast, or assembled line of characters, and preferably the machine is provided with means for automatically operating the device or devices selected as aforesaid. Many other new parts and combinations are embodied in the preferred form of machine.

My new machine is preferably provided with power connections, such as electromagnets and conductors, the circuits being closed by a suitable keyboard through contacts. The machine is also preferably provided with paper-feeding mechanism and with punches operated by the electromagnets, whereby the paper is provided with perforations for controlling in another machine the selection, production, assembling, or impression of characters and for properly and accurately justifying lines of such characters.

In the accompanying drawings is shown one form of machine which I have found to have many points of advantage. Such preferred form has, first, a keyboard mechanism which simultaneously controls the operation of one or more punches for providing a strip of paper with perforations and also controls the operation of impressing types and a platen-carriage which moves paper into position whereby a type-written record is made; the errors in said type-written record identifying, if desired, the errors in the perforated strip; second, means operated by or through the keyboard mechanism for selecting one or more punches (in the preferred machine these are also character-selecting punches) which provide the strip with perforations for determining the justification in a second machine of a line of characters; third, means for automatically operating (preferably as a result of or during the restoration of the platen-carriage) the selected punch or punches when employed for justification; fourth, automatically-operating means for feeding and winding the paper; fifth, means for automatically restoring the selecting device or devices to initial position and with various simplified combinations of parts for timing and controlling the operation of the aforesaid means.

Figure 9:
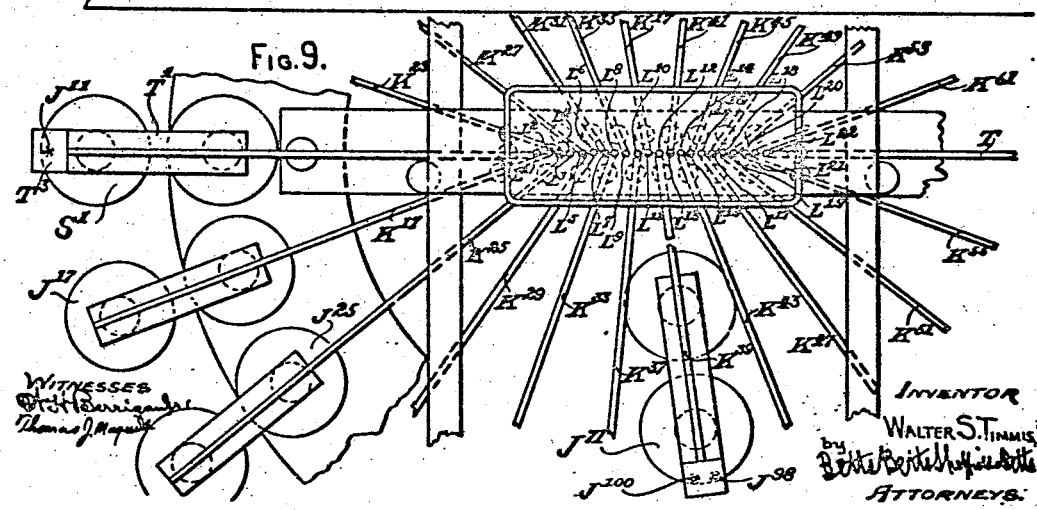
Figure 19:
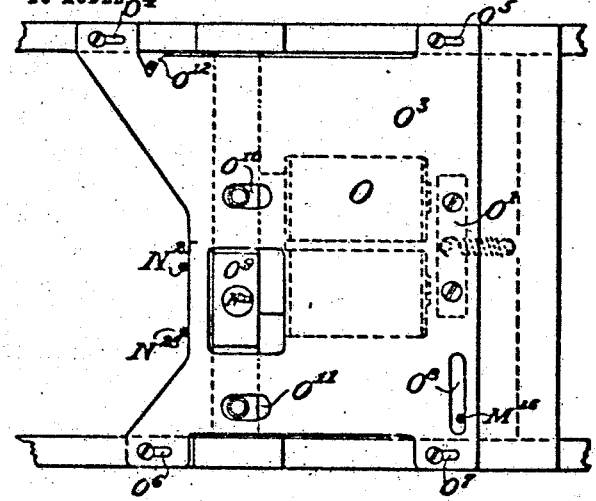
Figure 20:
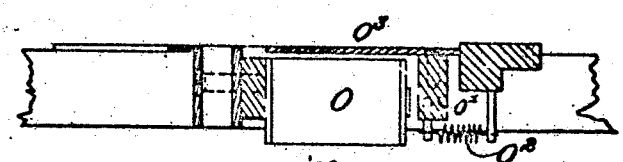
Figure 21:
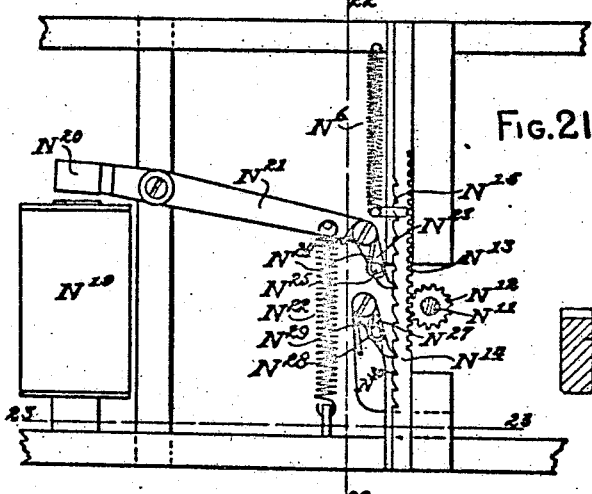
Figure 22:
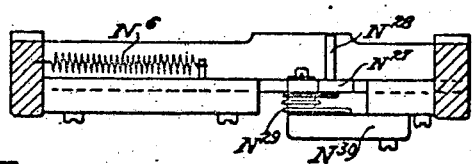
Figure 23:
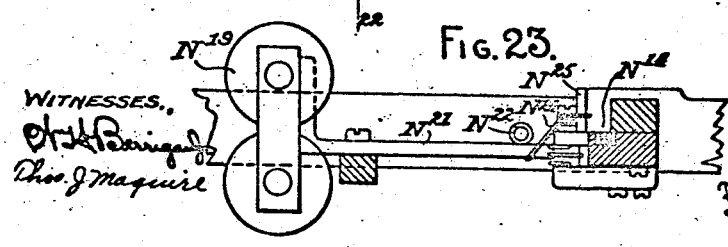
Figure 38:
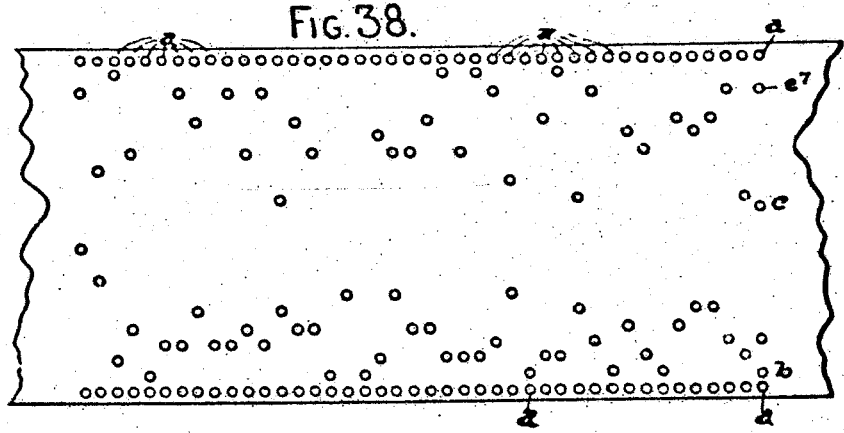
Figure 39:
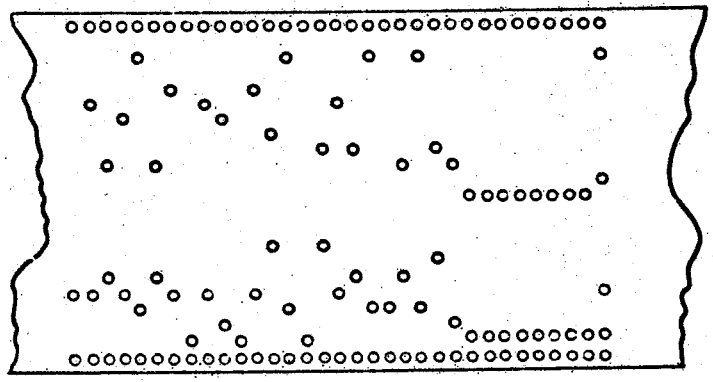
Figure 40:
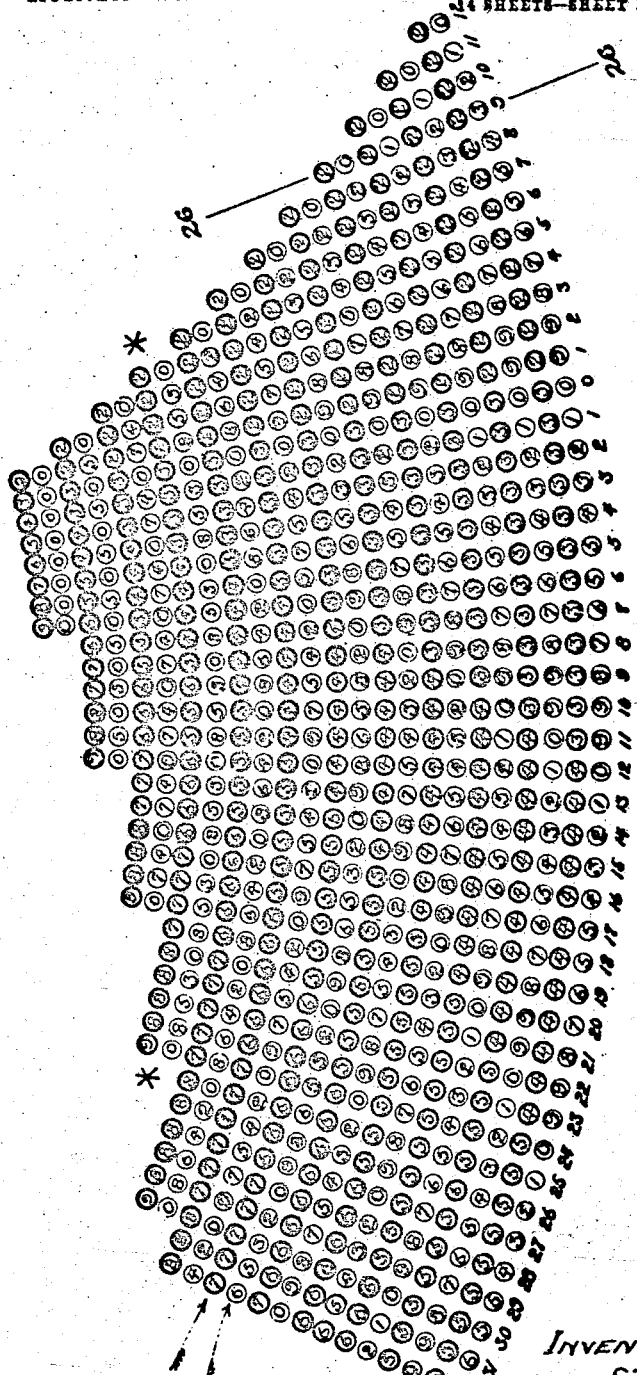

Referring to the said drawings, wherein similar letters indicate like parts, Figure 1 is a front view of the preferred form of machine, several punch-operating magnets being shown removed for simplification. Fig. 2 is a top view of the machine of Fig. 1. Figs. 3, 4, and 5 are details of the keyboard mechanism and circuit-closing devices operated thereby. Fig. 6 illustrates diagrammatically the electrical connections of the apparatus. Fig. 7 is a similar view of a portion of Fig. 6, showing the condenser for preventing sparking. Fig. 8 is a cross-sectional detail of the machine, showing the arrangement and control of the punches. Fig. 9 is a top view of a portion of Fig. 8. Figs. 10, 11, and 12 are respectively top and side views of the mechanism for operating the units-counting device and for controlling the operation of the same. Figs. 13 and 14 are details of the stops and means for operating the same. Fig. 15 is an enlarged view of a portion of Fig. 10. Fig. 16 is a rear view of the row of punches, showing the arrangement of stop-operating plates. Fig. 17 is a top view of the device for selecting the punch or punches to operate upon a strip to effect justification of a line of characters. Fig. 18 is a sectional view on line 18 18 of Fig. 17. Figs. 19 and 20 are top and sectional views of the means for releasing the counting mechanism. Fig. 21 is a top view of the mechanism for extending the selector-arm. Figs. 22 and 23 are views on lines 22 and 23 of Fig. 21. Fig. 24 is a top view of the selecting mechanism, showing the means for swinging the selector-arm, the restoring-spring, the contact-table for controlling the selection of the justifying punch or punches, the lamp-contacts, and the device for varying the length of line printed or set up by the controller. Fig. 25 is a side view showing the construction of the contact-table. Fig. 26 is a longitudinal section through said table, showing details of electrical connections. Fig. 27 is a side view, partly sectional, of the paper feeding and winding devices and the magnetically-controlled operating means therefor. Fig. 28 is a top view of the parts shown in Fig. 27. Figs. 29, 30, and 31 are detail views in several positions of the escapement for controlling the feed of the strip. Fig. 32 is a view, with the carriage raised, of the type-writer carriage, showing the devices connected therewith for closing the circuits which control the operation of the "line-trip" punch, control the guide-hole punches, short-circuit the counting mechanism, and subsequently effect the release and restoration to predetermined position of the parts of the selector. Fig. 33 is a rear view of the said circuit-closing devices detached from the machine. Fig. 34 is a front view of the same in circuit-closing position. Fig. 35 is a front view with the first-named circuit-closing devices restored to open position and the terminals of the release-circuit in contact. Figs. 36 and 37 are detail views showing the frictional connections between the type-writer carriage and the circuit-closing devices of Figs. 32 to 35. Fig. 38 is a view of a portion of a strip provided with perforations to control the impression or selection of a completely-filled and justified line of characters. Fig. 39 is a view of a portion of a strip, showing the conclusion of a paragraph, with "line-finishing" representations; and Fig. 40 is a developed view of the contact-table of the selecting mechanism, the units-contacts represented by dark circles and the fractions-contacts represented by light circles.

The preferred machine is designed to perforate a strip of paper with holes representing characters and other holes representing space in such a way that the representation thus effected will when utilized in a suitable secondary machine produce lines of justified type or printed matter, &c. The operation of this preferred machine is from a keyboard representing the characters to be selected, and all movements of the machine are controlled at the keyboard or by the return of a movable part—a type-writer carriage, for instance. In addition to perforating a representative strip this machine produces a type-written copy of the matter represented on the strip.

The illustrated machine is arranged to perforate a strip with representations of one hundred different characters, each of which is represented on the strip by combinations derived from eighteen holes, nine of which, in combination with the other nine, represent ten rows of characters having ten characters in a row. The last row in each direction is not represented by any holes, this being unnecessary. As shown, the machine has twenty-two punches arranged in a line transverse of the paper strip. Two of these, the first and last of the line, perforate the paper with guide-holes to correctly feed the paper in a secondary machine. Two other punches are employed, respectively, to provide the strip with "space-trip" and line-trip openings, the one indicating word-spaces and the other the conclusion or commencement of a line. The remaining eighteen punches are for the purpose of making in various combinations the perforations representing character selection, as explained. The paper is fed through the perforator with a step-by-step movement, operated at every character or space selection, and two guide-holes are punched at every selection, both character and space.

In order to effect in a secondary machine the automatic justification of an assembled, manufactured, or printed line of characters, I have provided the present machine with means for perforating the strip with openings representing the amount of justification to be inserted at each space in the line of characters in order to exactly fill out said line. The justification-perforations are arranged in the strip in two groups, one representing units and the other representing tenths of units, and these perforations may be made by the character-punches, which in the hereinafter-described machine are grouped for this purpose. As hereinafter-described, the particular justification-punches to fill any line are automatically selected and automatically operated. When the character-openings are employed for the purpose of controlling justification, the presence or absence of a certain perforation, in the present machine the line-trip perforation in line with the character-openings, will determine whether said openings shall represent space or characters. In order, also, that space-units shall be inserted at every space in the assembled, produced, or printed line of characters, the strip is provided when the machine illustrated is used with a space-trip opening, in combination with the line-trip opening and justification-openings aforesaid. In the secondary machine referred to the strip is passed through the machine in a direction the reverse of its passage through the perforating-machine, and the line-trip opening effects mechanism for beginning a new line of characters. The selected justification-openings indicate the amount of the spaces which shall separate each word of the line, and the space-trip openings everywhere throughout said line indicate where the spaces will occur.

In order that the proper justifying-punches shall be automatically selected, the machine is provided with a counting mechanism which is operated each time that a character or space perforation is made in the strip, moving a number of units corresponding to the "fatness" of the character represented and moving three units each time a space-perforation is made, except when the last space-perforation of a line is punched in combination with a line-trip opening. Said counting mechanism is arranged to operate a device which selects the particular punch or punches to be operated for the justification-openings. This device automatically selects the required punch or punches representing in units and tenths the product of the division of the total length of line in units less the unit widths of the characters of the line by the number of spaces in said line. Thus, for instance, a line of type being one hundred and eighty units, the characters thereof aggregating one hundred and twenty-six units, and the line containing seven spaces, it is obvious that the amount of space between each word in order to exactly justify the line will be slightly less than 7.8 units. By my improvement the selecting mechanism, automatically in the instance under consideration, will exclusively select of the punches representing justification the punch representing seven units and also the punch representing eight-tenths of a unit. As hereinafter explained, the selected punches are automatically operated.

In the accompanying drawings, A indicates the type-writer.

B B' B$^2$, &c., indicate the keyboard mechanism.

C C' C$^2$, &c., indicate the type-writer carriage and its parts and the circuit-closer for the selector-restoring devices.

D D' D$^2$, &c., indicate the circuit-closers and parts operated by the keyboard.

E E' E$^2$, &c., indicate the mechanism for winding the perforated strip.

F F' F$^2$, &c., indicate the paper-feeding devices.

G G' G$^2$, &c., indicate the parts of the escapement for controlling the feed of the paper.

H H' H$^2$ indicate the electromagnet and parts for operating the paper winding and feeding devices.

J J' J$^2$, &c., indicate the electromagnets for operating the punches and also indicate the wires exclusive of those extending from the selector.

K K' K$^2$, &c., indicate the armatures for operating the punches.

L L' L$^2$, &c., indicate the punches and parts operated thereby.

M M' M$^2$, &c., indicate the parts for operating and controlling the counting mechanism.

N N' N$^2$, &c., indicate the parts for operating and restoring the selector.

O O' O$^2$, &c., indicate the parts of the releasing mechanism.

P P' P$^2$, &c., indicate the parts connected with the type-writer carriage for automatically effecting the operation of the justification-punches, line-trip, &c.

Q Q' Q$^2$, &c., indicate the alarm-lamp and connections.

R indicates the line-finishing key employed to fill the concluding line of a paragraph.

S S', &c., indicate the magnets controlling the guide-hole punches; T T', the armatures thereof; U, the spacing-bar of the type-writer.

V V' V$^2$, &c., indicate the parts of the contact-table of the selector. $v'$ $v^2$ $v^3$, &c., indicate the wires leading from said selector.

X indicates the wires operated by the keyboard connected to the circuit-closers D.

Y indicates the indentation-key.

*Character selection.*—The type-writer A or other key-operated device may be of any suitable construction.

B indicates the keys, which include the usual character-keys and special keys (see Fig. 2) known as a "line-finishing" key R and an "indent-key" Y. The keys are connected to key-bars B', Figs. 3, 4, and 5, and pivoted in any suitable way, and beneath each key-bar there are one or two vertically-extending pins B$^2$, the said pins passing through openings in upper and lower bars B$^3$ and B$^4$. Each pin is provided with an opening B$^5$, and wires X are passed through the said openings of the pins. These wires are fastened to pegs X', Fig. 1, and to pins D$^4$ (see Fig. 3) of the circuit-closers. In the preferred arrangement there are twenty-two of the said wires X, and each wire freely passes through one, two, three, or more of the pins B$^2$. In view of the fact, as stated, that one or two pins are placed beneath each key-bar, it is obvious that upon pressure of any of the character-keys one or two of the pins will be depressed and corresponding wires X will be pulled, closing a similar number of connected circuits, as hereinafter described. It will be understood, of course, that the arrangement of pins, wires, &c., will be different for each key-bar employed, whereby different wires or combination of wires will be operated by depression of different character-keys.

*Circuit-closing.*—Each wire is connected at one end to a circuit-closer D, and inasmuch as there are in the preferred machine one hundred character-keys and but eighteen of the twenty-two wires and circuit-closers D employed to affect character-perforation devices it is necessary to operate said circuit-closers in combination and to have all of said combinations different in order to give each character-key its proper value. The remaining circuit-closers are for the purpose of controlling special mechanisms or effecting special results, as hereinafter explained. The position and number of the pins with relation to the key-bars and their engagement with different wires cause the operation of the circuit-closers as desired, and these circuit-closers are operated in the preferred machine singly, as well as in different combinations of two. All of the wires pass through openings $B^6$ in uprights $B^7$, these uprights constituting the bearings for the wires and giving a direct pull upon the circuit-closers operated by the wires.

In the preferred machine the circuit-closers D (see especially Figs. 3, 4, and 5) consist of vibrating arms D, mounted independently upon a bar $D^3$ in a frame provided with a forward part $D'$, holding the forward contacts of the circuit-closer, and with rearward brackets $D^2$, which support the several restoring-springs. Each circuit-closer is connected to a wire X by means of a pin $D^4$, which has a slight play in the arm D, the wire being connected to the forward end of the pin and a spring $D^6$ being interposed between the rear of the arm and a collar $D^5$ on the pin. The rearward end of each pin $D^4$ is connected by a separate spring $D^7$, the rearward end of which is secured to a hook or loop upon a bar $D^8$, bolted between the brackets $D^2$. Each arm D carries a contact $D^9$, Figs. 3 and 5, and these when the arms are pulled by the wires X contact with contacts $D^{10}$, which are fitted in and separated by an insulating-block $D^{15}$, fastened between the upper ends of the brackets $D'$. The contacts $D^{10}$ are connected by clamping-screws $D^{11}$ with wires $D^{12}$, which are electrically connected with punch-operating electromagnets, as hereinafter described. A return-wire $D^{13}$, Fig. 5, is connected by a screw $D^{14}$ to the frame $D'$.

The connections from the wires $J^{12}$ to the punch-operating electromagnets are shown diagrammatically in Fig. 6, and the relation of the magnets, armatures, and punches is shown in Figs. 1, 2, 8, and 9.

*Paper-winding mechanism.*—The machine is provided with a winding mechanism E, Figs. 1, 2, 27, 28, 29, 30, and 31, for winding a strip $F^7$ after perforation thereof by the punches. In the preferred machine I employ means for winding the perforated paper upon a roll and impart rotary motion to the exterior of the roll, whereby I dispense with the necessity for employing differential-feed mechanisms. As illustrated in the accompanying drawings, especially Figs. 27 and 28, my improved surface-winding device comprises a roll $E^2$, preferably roughened, driven by a ratchet-wheel $E'$, and a second roll, also preferably roughened, arranged parallel to that first-named, both rolls being provided at their ends with gears in mesh with an intermediate gear $E^8$. The rolls and the gears aforesaid are mounted between the uprights $E^4$, and the roll $E^5$ of paper, constantly enlarging, rests upon both rolls $E^2$ and $E^3$ and is held down to said rolls in order to be driven frictionally by a rotatable weight-roll $E^7$. In order to maintain the several rolls in position, the paper-roll $E^5$ and the weight-roll $E^7$ are provided with axial projections, which are fitted loosely in the slots $E^8$ of the uprights $E^6$. By the arrangement described when the ratchet $E'$ is engaged and moved the motion is communicated to the rolls $E^2$ and $E^4$, which engage the surface of the wound roll of paper, and inasmuch as the rolls $E^2$ and $E^4$ contact with the surface of a roll of paper which has a movable axis and which is held into engagement with them by friction only the said rolls $E^2$ and $E^4$ will always engage with and move the same length of paper strip, irrespective of the size of the roll. So far as I am aware no person prior to my invention has ever provided a machine for making controllers with a surface-driving paper-winding mechanism, said machines employing either differential-feed mechanisms, which give to the roll while being wound gradually-shortened movements, or employing idly-operating mechanism.

The machine is provided with means for feeding a strip of paper into position to be punched. This in the preferred form of machine (see Figs. 27 and 28) comprises rolls $F'$ and $F^2$, the latter of which, yieldingly bearing against the former, is mounted between the arms $F^3$ of an oscillating frame mounted upon a bar $F^4$, and said roll $F^2$ is held into yielding contact with the roll $F'$ by means of a spring $F^{11}$, secured to an arm $F^5$ of the oscillating frame and to the frame of the machine. The roll of paper to be unwound is mounted into position by placing the axial bar in the forked ends of uprights F, Fig. 27, and the paper is drawn from said roll and passed downwardly between the rolls $F'$ and $F^2$ and thence between the rolls of the escapement-rolls $G'$ and $G^2$, hereinafter described, care being taken to have the paper loose between the feed-rolls and the escapement-rolls, a loop being left for this purpose. Motion is imparted to the feed-rolls by means of a pawl $H^8$, Fig. 27, mounted upon one end of a swinging arm $H^6$, the other end of which is pivoted about the axle of the roll $F'$. Said pawl engages the teeth of a ratchet $F^8$, Fig. 28, secured to one end of the roll $F'$, to the opposite end of which is secured a gear-wheel $F^9$, which engages a similar toothed wheel $F^{10}$, secured to one end of the roll $F^2$.

I have shown in the accompanying drawings electrically-controlled means for imparting motion to the paper-feeding mechanism and to the paper-winding mechanism. The electrical connection of said device is shown in the diagram Fig. 6, and the mechanical details thereof are shown in Figs. 27 and 28 of the accompanying drawings. Referring to the latter, H indicates an electromagnet, and $H'$ its armature, made fast to a rocking bar $H^4$, near one end of which is fixed a bell-crank lever, one arm $H^2$ of which is connected by a spring $H^3$ to the frame of the machine. The lower end of such arm is connected to a link $H^5$, the upper end of which is connected to the swinging arm $H^6$, already described. $H^9$ indicates the upper arm of the bell-crank lever, and this arm carries at its end a pawl H¹⁰, held into engagement with the ratchet E', hereinbefore described, by a spring H¹¹. When the magnet H is energized, the armature H' will be attracted. As a result of this movement the arms H⁹ and H² will be moved, respectively, downwardly and upwardly, the latter against the power of the spring H³, the pawl H⁹ will be thrown backward into engagement with the next tooth of the ratchet F⁸, and the pawl H¹⁰ will be drawn downward into engagement with the next tooth of the ratchet E', and upon the opening of the circuit through H the lever will be restored to normal position by the spring H³, and as a consequence of this return the ratchets E' and F' will each be moved one space or tooth. Preferably the amount of paper wound at E will be the same as that fed at F, whereby the loop will be preserved during the operations of the machine and the paper will be relieved of unnecessary tension.

In order to facilitate the movement of the strip between the feeding and winding mechanisms, I have provided the machine with an escapement device whereby the exact amount of paper will be fed for each line of perforations, assuring when placed in another machine exact coöperation with the feeding parts. The escapement referred to comprises (see Figs. 27, 28, 29, 30, and 31) rollers G' and G², the last named being mounted between the arms G³ of a vibratory frame pivoted upon a cross-bar. The said roller G² is held yieldingly to G' by means of a coiled spring G²⁵. (See Fig. 27.) The paper fed between rolls F' and F² is passed between G' and G², as shown.

G⁴ is a vertically-reciprocating bar guided by means of slots G⁵ and G¹⁶ and fitting screws G⁶ and G¹⁷. The upward motion of said bar is limited by a pin G⁷, fitted in an upright F of the machine. Motion is communicated to said bar G⁴ by means of an armature of one of the electromagnets—for instance, one of the armatures which operate the guide-hole magnets S or S'—this arrangement assuring a movement of bar G⁴ every time a punch-magnet is energized. An escapement-pawl G⁸ is pivoted at G⁹ upon said bar and is provided with two forward teeth, one, G¹⁰, for engagement by a latch, hereinafter explained, and the other, G¹¹, adapted to engage the teeth of the wheel G¹², secured to roller G'.

G¹³ is a rotative bar provided with a handle and pivoted upon a pin G¹⁴, which carries an eccentric block G¹⁵, resting between the teeth G¹⁰ and G¹¹ of the escapements. Referring especially to Figs. 29, 30, and 31 of the drawings, the positions of the block G¹⁵ and escapement are shown. When the bar G¹³ is thrown forward, the block lifts the escapement out of engagement with G¹² and locks it securely in such position, and when the bar G¹³ is returned to rearward position the escapement is permitted to drop to engaging position.

While the pull exerted by the winding mechanism may be relied upon to keep the proper tension on the paper passing between the rolls G' and G² and to draw forward a substantially equal quantity upon each winding movement, yet I prefer to provide the machine with means for positively feeding the paper between the rolls G' G². For this purpose I have provided the machine (see Fig. 27) with a connection, a bar G¹⁶ leading from the paper-feed mechanism and carrying a pawl G¹⁷, which engages the teeth of the wheel G¹³. Obviously upon the operation of the paper-feed mechanism there will be a simultaneous movement of escapement-rollers G' G². In order to control this movement of the rollers, the escapement G⁸ is provided. When this escapement is unlocked and engaging the wheel, as shown in Fig. 31, its operation is as follows: Upon reciprocation of the bar G⁴ the escapement is lifted so as to disengage from the wheel G¹², which moves in the direction indicated by the arrows, Figs. 29 to 31, the tooth G¹¹ during the rising motion frictionally engaging the edge of the block G¹⁵ until said tooth rises above the point of the tooth of the wheel, whereupon the escapement swings upon the pivot G⁹ and drops into engagement with the next succeeding tooth of the wheel G¹². Upon the return of the bar, which occurs when the circuit is broken, the parts of the paper-feed mechanism which are operated upon the restoration of armature H' throw the wheel G¹² forward one notch, bringing the tooth G¹¹ firmly against block G¹⁴. It will thus be seen that upon the closing of a circuit at the keyboard the escapement will be moved backward one tooth and upon the opening of said circuit the wheel G¹² will be driven forward a space corresponding to one tooth. Simultaneously the paper-winding movements will occur and the portion of the strip between the punches and the winding device will be held taut, but without strain.

*Arrangement of perforating devices.*—My new machine is provided with a plurality of electromagnets, preferably twenty-two in number, which control the operation of perforating-punches. Referring to the diagram Fig. 6, it will be seen that I have lettered two of said magnets S and S'. These control the operation of punches (designated at L' and L²² in Fig. 8) for providing the strip with guide-openings near its edge, whereby the feeding and position of the strip in a secondary machine will be controlled. One of these, S', as hereinafter explained, also controls the operation of the paper-winding mechanism and of a mechanism for counting the units in a predetermined line. The remainder of the grouped magnets are designated in Fig. 5 as J¹⁷, J²³, J²⁵, J²⁷, J²⁹, J³¹, J³³, J³⁵, J³⁷, J³⁹, J⁴¹, J⁴³, J⁴⁵, J⁴⁷, J⁴⁹, J⁵¹, J⁵³, J⁵⁵, J⁶¹, and J⁷¹. Of these magnets all excepting J⁶¹ and J⁷¹ are employed for the operation of punches singly or in various combinations of twos, which provide the strip with perforations adapted in a secondary machine to control the imprinting, selection, assembling, or manufacture of characters. The said punches are designated in Fig. 8 as $L^3$ $L^4$ $L^5$ $L^6$ $L^7$ $L^8$ $L^9$ $L^{10}$ $L^{11}$ $L^{13}$ $L^{14}$ $L^{15}$ $L^{16}$ $L^{17}$ $L^{18}$ $L^{19}$ $L^{20}$ $L^{21}$. These magnets, excluding, as before, $L^2$ and $L^{12}$, are divided into two groups, one representing the "fatness" or width of the character to be imprinted, selected, assembled, or made by a secondary machine, as fully explained hereinafter, the other controlling, together with the first-named group, the perforation of the strip, whereby in a secondary machine different combinations of arresting-stops will be thrown to control the operations in several directions—say reciprocatory and rotary—of a printing-roller, for example, bearing a large number of characters arranged in rows according to fatness or unit widths. In the first of these groups of magnets I include (see Fig. 6) magnets $J^{55}$, $J^{53}$, $J^{51}$, $J^{49}$, $J^{47}$, $J^{45}$, $J^{43}$, $J^{41}$, and $J^{39}$, and in the second-named group I include magnets $J^{37}$, $J^{35}$, $J^{33}$, $J^{31}$, $J^{29}$, $J^{27}$, $J^{25}$, $J^{23}$, and $J^{17}$. Each magnet of the first-named group represents a row of characters, all of the same row being of the same fatness or width, and I have found it convenient in a secondary machine to arrange the characters in ten rows of ten characters each on a cylinder or plate, as follows: one row of ten two-unit characters, two rows of ten three-unit characters, three rows of ten four-unit characters, two rows of ten five-unit characters, two rows of ten six-unit characters.

In the operation of the secondary machine referred to I have not found it necessary to throw up any stop or stops to control the presentation of the last row in either direction of the characters, and in the controller-producer machine forming the subject-matter of this application I have omitted any punch or magnet for providing the strip with an opening or openings for operating limit-stops in either directions. Instead, therefore, of employing twenty magnets, one for each of the ten rows and one for each of the ten characters of a row, I am enabled to use nine for each direction, making eighteen in all.

I have heretofore spoken of the magnets $J^{61}$ and $J^{71}$, controlling the punches $L^2$ and $L^{12}$. The first-named punch is intended to provide a strip with a space-trip opening to control a device in a secondary machine for spacing the words of a line of characters, and the second-named punch is intended to provide a strip with a line-trip opening to control a device in the secondary machine for beginning a line of characters. The magnets J control the armatures K, (see especially Figs. 8 and 9,) each of said armatures being lettered to correspond with the magnet controlling it. The magnets S and S', controlling the guide-hole punches, control armatures T and T', and the manner of mounting all of the armatures employed is shown in Fig. 8, wherein armatures T and T' are shown pivoted at $T^2$ in the upper bifurcated ends of posts $K^{36}$, which also space apart and support the upper and lower frames $K^{37}$ and $K^{38}$, the devices for supporting and guiding the punches being carried by said upper frame. The lower ends of the punches L' $L^{22}$ rest upon the inner ends of the armature-bars, and when the outer ends of said magnets are drawn downwardly the punches, moving upwardly, perforate the strip. Upon deenergizing the magnets the punches and the armatures are restored to normal position by springs $L^{99}$, Fig. 8, which shows the punches with their opposite ends bearing against a cross-piece of the machine and against collars formed on the punches.

The punches which perforate the strip with openings for designating the fatness or width of characters are lettered in Figs. 8 and 10 as $L^2$, $L^3$, $L^4$, $L^5$, $L^6$, $L^7$, $L^8$, $L^9$, and $L^{10}$, and to these punches are secured plates or blocks $L^{23}$, $L^{24}$, $L^{25}$, $L^{26}$, $L^{27}$, $L^{28}$, $L^{29}$, $L^{30}$, and $L^{31}$, which, as hereinafter explained, raise certain stops into position, whereby a counting mechanism is controlled. Said plates are divided into four groups—first, $L^{24}$ for raising a stop representing two units; second, $L^{23}$, $L^{25}$, and $L^{26}$, any of which raise a stop representing three units; third, $L^{27}$, $L^{28}$, and $L^{29}$, any of which raise a stop representing four units, and, fourth, $L^{30}$ and $L^{31}$, either of which raises a stop representing five units, all as and for the purpose hereinafter described. It is sufficient to say now that each of the punches $L^3$ $L^{10}$ is operated in combination with the punches $L^{13}$ $L^{21}$, various combinations affecting various relations of perforations, also that punches L' and $L^{22}$ are employed for the making of guide-openings, and that punch $L^{12}$ is employed for the making of line-trip openings.

*Wiring diagram.*—Referring now to Fig. 6, I have shown diagrammatically the electric circuits and connections controlling the operation of the punches and their combinations. The contact-arms D are lettered (see also Figs. 4 and 7) $d'$ to $d^{22}$, and the wires leading from the opposite contacts ($D^{10}$ in Figs. 3 and 5) are lettered J', $J^8$, $J^{16}$, $J^{21}$, $J^{24}$, $J^{26}$, $J^{28}$, $J^{30}$, $J^{32}$, $J^{34}$, $J^{36}$, $J^{38}$, $J^{40}$, $J^{42}$, $J^{44}$, $J^{46}$, $J^{48}$, $J^{50}$, $J^{52}$, $J^{54}$, $J^{56}$, and $J^{62}$. The wires leading to magnets for effecting character-perforations are $J^{16}$ to $J^{17}$, $J^{21}$ by wire $J^{22}$ to magnet $J^{23}$, $J^{24}$ to $J^{25}$, $J^{26}$ to $J^{27}$, $J^{28}$ to $J^{29}$, $J^{30}$ to $J^{31}$, $J^{32}$ to $J^{33}$, $J^{34}$ to $J^{35}$, $J^{36}$ to $J^{37}$, $J^{38}$ to $J^{39}$, $J^{40}$ to $J^{41}$, $J^{42}$ to $J^{43}$, $J^{44}$ to $J^{45}$, $J^{46}$ to $J^{47}$, $J^{48}$ to $J^{49}$, $J^{50}$ to $J^{51}$, $J^{52}$ to $J^{53}$, and $J^{54}$ to $J^{55}$, wire J' to wire $J^2$ and to guide-hole magnet S, in series with the other guide-hole magnet S', by means of wire $J^3$, and by wires $J^4$, $J^5$, and $J^6$ these magnets S and S' are connected with the generator $J^7$. The wire $J^8$ leads to the counting-magnet M and from thence by wires $J^{64}$, $J^5$, and $J^6$ to generator $J^7$, already described. Wire $J^{56}$ leads by wire $J^{57}$ to a magnet $N^{19}$, controlling, as will be explained, a selector-arm, and from thence by wires $J^{58}$ $J^{59}$ $J^{60}$ to the space-trip magnet $J^{61}$. The line-trip magnet $J^{71}$, as hereinafter described, is energized by the closing of contacts carried by the type-writer carriage. The wire $J^{62}$ leads directly through wire $J^{60}$ to the space-trip magnet $J^{61}$. Assuming now that a key is operated—say $B^{99}$, Fig. 4—the key-bar connected to said key will push the two pins $B^2$ underneath the same, and as a result the wires X, connected to arms $D^4$ and $d^{13}$, will be pulled and the circuits will be closed at the contacts of those arms. The current will then flow (see Fig. 6) from the generator $J^7$ by wire $J^{15}$ to the arms $d^4$ and $d^{13}$. From the first named the current will flow by $J^{21}$ to magnet $J^{23}$, and from $d^{13}$ the current will flow by $J^{40}$ to the magnet $J^{41}$, and from the coils of these magnets the current will pass by wire $J^{18}$ to $J^{19}$ through the coil of a relay $J^{20}$ and by wires $J^5$ and $J^6$ to the generator $J^7$. The energizing of the magnets $J^{23}$ and $J^{41}$ will cause the simultaneous operation of the punches $L^3$ and $L^{13}$. (See Figs. 8 and 9.)

Referring to the relay $J^{20}$, just spoken of, the energizing of this relay will close a circuit through the guide-hole magnets S and S' as follows: from the generator $J^7$ by wire $J^{15}$, bar $D^3$, Figs. 3 and 5, wire $J^{13}$, wire $J^{14}$, relay $J^{20}$, wire $J^2$, coil of magnet S, wire $J^3$, coil of magnet S', wire $J^4$, wire $J^5$, and wire $J^6$ to the generator. As a result of the energizing of the two magnets S and S' the punches $L^2$ and $L^{22}$ (see Figs. 8 and 9) are moved, and the strip is provided with openings near its edges, (see $a$, Figs. 38 and 39,) utilized in a secondary machine to guide the strip. It will thus be seen that the operation of a key B will cause the operation of two character-punches and both guide-hole punches. As hereinafter explained, the movement of the armature of one of the guide-hole punches also controls the feeding and winding of the paper and the counting mechanism.

In the practical operation of the machine when employing lighting or motor currents it has been found that there is a tendency to "arcing" or sparking between the contacts $D^9$ and $D^{10}$. Various expedients for preventing or extinguishing the arcs may be availed of. In Fig. 7 I have shown one arrangement found by me to be satisfactory for this purpose. This consists of the inclusion in line $J^6$ of a condenser and separated contacts brought together or bridged in any suitable way. I prefer that the contacts Z and Z' shall be moved together or otherwise connected by a device common to or operated by all bars of the type-writer. By this arrangement all arcing is localized at one point of the equipment at contacts Z and Z' instead of at the several arms $d'$ to $d^{24}$ and will be extinguished by the condenser.

*Counting.*—The machine is provided with a counting mechanism employed for the purpose of counting as the perforations are made the number of units represented by the character and space perforations in the strip.

As hereinbefore explained, the characters to be produced, assembled, or printed in a secondary machine are of different fatness or unit widths, and where there are one hundred characters these will be provided in the following order: ten (10) two-unit characters, twenty (20) three-unit characters, thirty (30) four-unit characters, twenty (20) five-unit characters, and twenty (20) six-unit characters, five different widths in all. Upon the selection of a character by the operator the proper combination of magnets is energized and corresponding punch-pins perforate the paper. The member ($L^5$ to $L^{10}$) of this combination representing the width of the characters selected will, as hereinafter explained, raise a pin in the path of a slide for operating the counting mechanism, which pin serves to arrest the slide at the proper distance to give a units-wheel a movement corresponding to the character's width in units. Simultaneously at word-spaces the space-trip punch is operated and the units-wheel advanced three units.

The devices for controlling the operation of the units-wheel are expressly shown in Figs. 10, 11, 12, 13, 14, and 15 of the accompanying drawings, wherein M indicates an electromagnet, and M' its armature secured to a lever-arm $M^3$, pivoted at $M^2$. A spring $M^5$ engages a projection $M^4$ from the arm and a projection $M^6$ from the frame, holding the armature away from the magnet. The outer end of arm $M^3$ is connected by a link $M^7$ to a reciprocatory slide $M^8$, the latter being guided by screws $M^9$ and $M^{12}$, fitting slots $M^{10}$ and $M^{11}$. Said slide carries a pawl $M^{13}$, pivoted at $M^{14}$ and having its rear arm connected to the slide by a spring $M^{15}$. The units-wheel $M^{18}$ is for convenience shown as a flat disk $M^{16}$, having a great number of teeth $M^{17}$. Said wheel revolves upon an axis $M^{99}$, as hereinafter described. It is obvious that when the magnet M is energized the armature M' will be attracted and the slide $M^8$ will be pulled by link $M^7$, carrying the pawl forward. Said pawl, engaged with the toothed edge of disk $M^{18}$, will revolve the wheel. The spring $M^5$ will restore the armature, slide, and pawl to normal positions, while the disk will be held by a spring-pressed stop $M^{101}$ in the advanced position. (See Fig. 17.) The slide is provided with five downwardly-extending projections (see especially Fig. 11) $M^{19}$, $M^{20}$, $M^{21}$, $M^{22}$, and $M^{23}$, constituting fixed stops, and the cross-block $M^{33}$ of the counting mechanism is provided with four movable stops $M^{23}$, $M^{24}$, $M^{25}$, and $M^{26}$ and with a fixed stop $M^{97}$, known as the "limit-stop." $M^{33}$ is the two-unit stop, $M^{34}$ is the three-unit stop, $M^{95}$ is the four-unit stop, and $M^{96}$ is the five-unit stop. As will be seen in Fig. 10, the stops are arranged in pairs $M^{19}$ and $M^{98}$, $M^{20}$ and $M^{34}$, $M^{21}$ and $M^{95}$, $M^{22}$ and $M^{96}$, and $M^{23}$ and $M^{97}$, successive pairs being arranged at successively greater distances. Referring now to Figs. 13 and 14, it will be seen that the movable stops are secured to plates $M^{88}$, $M^{89}$, $M^{90}$, and $M^{91}$, the first carrying stop $M^{96}$, the second carrying stop $M^{95}$, the third carrying stop $M^{93}$, and the fourth carrying stop $M^{94}$. The plates and stops are held in retracted position by springs $M^{92}$, Figs. 13 and 14. The forward ends of the plates are adapted to rest upon the plates $L^{23}$ to $L^{31}$, (see Figs. 8 and 10,) the plate $M^{91}$, carrying the three-unit stops, resting upon plates secured to punches $L^2$ $L^4$ $L^5$; the plate $M^{90}$, carrying the two-unit stop, resting upon plates secured to punch $L^3$, the plate $M^{89}$, carrying the four-unit stop, resting upon plates secured to punches $L^6$ $L^7$ $L^8$, and the plate $M^{88}$, carrying the five-unit stop, resting upon plates secured to punches $L^9$ and $L^{10}$. The object of employing the stops is to control the length of stroke of the slide $M^8$, so as to give to the disk $M^{18}$ a number of unit movements corresponding with the width of the character or space represented by the operation of the punch or punches. Thus, for instance, if the punch $L^3$ is operated the connected plate $L^{24}$ will be lifted, and this will cause the lifting of plate $M^{90}$ and the projection of pin $M^{93}$ into the path of the fixed stop $M^{19}$, carried by the slide $M^8$, when the magnet M is energized, permitting that slide to move only far enough to move the units-wheel two spaces. This instance is selected for example merely. I desire, however, to call especial reference to the plate $L^{23}$, carried by the space-trip punch $L^2$. This plate, as will be seen by an examination of Fig. 10, moves the plate $M^{91}$, connected to the three-unit stop $M^{94}$. In the operation of my machine I prefer that the units-wheel shall be moved three units for each normal space representation in the strip. As hereinafter explained, however, and in special instances a space may represent more than three units. In order that the two-units plate $M^{90}$ and the three-units plate $M^{91}$ shall not interfere when arranged as shown, the forward end of the former is recessed or bent downwardly, so as to be out of engagement with $M^{91}$ when raised. As pointed out, the punches $L^2$ to $L^{10}$ are provided with plates $L^{23}$ to $L^{31}$, which engage the plates connected with the movable stops. Thus the movement of the wheel for two, three, four, or five units is controlled. In order, however, to move the units-wheel six units, it is not necessary to interpose any of the stops, but merely to allow the fixed stop $M^{23}$ to be drawn against the fixed stop $M^{97}$, which will occur whenever the punch $L^{11}$ is operated alone or in combination with any of the punches $L^{13}$ to $L^{21}$. I prefer that the slide $M^8$ shall not be moved forward until the selected stop has been fully brought into position, and in order to accomplish this my new machine is provided with means for cutting the slide-magnet M into circuit only after the punches have been moved. While many arrangements for doing this will readily suggest themselves to skilled persons, I prefer that illustrated in Figs. 6, 8, and 9, wherein the energizing of magnet M is put under the control of the guide-hole-punching devices which, as hereinbefore explained, are operated every time any punch or punches $L^2$ to $L^{21}$ are operated. The guide-hole punches $L'$ and $L^{22}$ are under the control of magnets S and S', and I prefer to secure the circuit-closer for the magnet M to the armature T', one manner of doing which is shown in Figs. 8 and 9. In said drawings an insulated block $T^3$ is secured to the extremity of the armature T', and a second insulated block $T^4$ is secured to the top of the spool of magnet S'. Into the last-named block a contact $K^{12}$ is fixed and is connected to a wire $J^{13}$, and in the block $T^3$ a yielding contact $J^{11}$ is placed under control of springs $J^{14}$. This contact is secured to a wire $J^{10}$. As clearly shown in Fig. 6, the contacts $J^{11}$ and $J^{12}$ close a separate circuit. The circuits which are closed by the operation of the arms $d'$, &c., and through the relay $J^{20}$, whereby the guide-hole magnets S and S' are energized, have hitherto been described. The circuit closed at $J^{11}$ $J^{12}$ may be traced as follows: by wire $J^{13}$, contacts $J^{12}$ and $J^{11}$, by wire $J^{10}$, coil of winding-magnet H, (heretofore described,) by wire $J^9$, coil of counting-magnet M, by wire $J^{64}$, by wire $J^5$, wire $J^6$, and generator $J^7$. It will thus be seen that the winding-magnet and counting-magnet are in series and that both are energized only upon the operation of the guide-hole armatures, the magnets of which are controlled through relay $J^{20}$. This arrangement insures that the punches $L^2$ to $L^{21}$ shall be operated and the proper stops $M^{93}$ to $M^{96}$ completely thrown into position when necessary before the magnet M controlling the slide $M^8$ is energized.

I have now described the devices and connections all under control of the keyboard, whereby a strip of paper is fed into position to be punched, is then punched with combinations of holes representing characters and spaces and with guide-holes for controlling its operations in a secondary machine, and is wound upon a roll or spool to be employed for printing, producing, or assembling a line of characters. I have also described and shown a mechanism for counting the number of units corresponding to type units represented by the perforations for the characters and spaces already inserted in the line.

*Automatic selection.*—In addition my new machine is arranged to automatically provide the strip with openings representing the amount of space counted as type units necessary to be inserted in the operation of the secondary machine to completely "justify" or fill out the line of characters. In another application I shall show and describe a machine comprising a mechanism which is controlled by the said justification-openings and is arranged to practice a method (devised by me and shown and described in an application filed October 12, 1901, Serial No. 78,414) which consists in adding only complete units to the spaces of a line, fractions being accumulated until they equal unity and then inserted. An especial aim of my present invention, however, is to provide means for automatically selecting the punch or punches required to be operated for making the particular justification-openings desired and, further, to provide means whereby the selected punch or punches will be operated, preferably automatically.

In order to simplify the machine and to use a narrow strip of paper, I have so arranged the present machine as to render the employment of special justification-punches unnecessary, employing the character-punches for this purpose. According to this method the character-openings when employed alone are useful in a secondary machine for controlling the printing, producing, or assembling of characters; but when employed in connection with other openings the character-openings are useful only for spacing purposes, determining the size or width of the quad to be inserted or made or the distance between the printed words. As before explained, the strip is provided with space-openings, and these determine where space shall be. The justification-openings determine the distance at each of these spaces. In carrying out my invention I divide the character-punches into two groups, one representing units from two to eight, inclusive, and the other representing fractions (tenths) of units from naught to eight, inclusive. These punches are $L^3$ to $L^9$ (representing units) and $L^{13}$ to $L^{21}$, (representing tenths.) Punches $L^{10}$ and $L^{11}$ are not used for justification purposes.

$L^2$ is the space-trip punch, $L^{12}$ is the line-trip punch, and $L'$ and $L^{22}$ are the guide-hole punches.

The automatically-operating selector mechanism operates on the following principle: Whenever a line is to be concluded, the number of units employed by the character is subtracted from the total number of units included in the line and the result is divided by the number of spaces in the line, and justification-openings representing units and fractions are punched in the strip. Thus suppose the strip is to be punched to represent the following sentence: "A line of type consists of many parts" and that the sentence is to exactly fill a line of one hundred and eighty units. The width of the characters selected aggregates one hundred and twenty-six units, leaving fifty-four units to be divided into seven spaces or when the line is to be completely justified seven and eight-tenths units to be inserted at each space. It will therefore be necessary to operate the punches $L^8$ (representing the seven units) and $L^{21}$, (representing eight-tenths,) and it will also be necessary to operate the space-trip punch $L^2$ and the line-trip punch $L^{12}$.

While I may employ different forms of apparatus for automatically selecting the punch or punches to be operated at the end of a line in order to justify the same, I prefer the arrangement hereinafter described, and shown in the accompanying drawings, (especially Figs. 17, 18, 24, 25, and 26,) which readily lends itself to the selection of every possible combination of justification-punches. Such preferred mechanism consists of an arm N, to the forward end of which (see Figs. 25 and 26) is attached an insulating-block N', carrying two spring-pressed circuit-closers $N^2$ and $N^3$, the former of which is connected to a wire $J^{34}$, leading (see Fig. 6) to a circuit-terminal $J^{97}$, and the latter of which, $N^3$, is connected to wires $J^{73}$ and $J^{75}$, leading to the terminal $J^{99}$. The arm N is arranged to have forward and retractive movements in a guide $N^4$, pivoted near its rear end by means of a flat plate $N^5$, loosely surrounding a bushing $N^{17}$, upon which the units-wheel $M^{18}$ (see Fig. 18) rotates. The guide $N^4$ is provided with forward and rear bands $N^7$, passing around the arm N and steadying it longitudinally. Said arm is provided with a toothed rack $N^8$, (see Figs. 17 and 24,) the teeth of which engage a toothed wheel $N^9$, operated as hereinafter described. In order to swing the arm N about its pivot, the units-wheel $M^{18}$ is provided with a projecting pin $M^{100}$, which as the wheel is advanced presses against the side of the guide $N^4$ and forces the arm forward until the line is completed. I have found that it is unnecessary to have the arm N moving at all times with the units-wheel $M^{18}$, but that said arm need not begin to move until the wheel has reached, say, thirty-two units from the end of the line. For this reason the wheel and the arm are independent, and I have provided means whereby while the wheel will be invariably restored to the beginning of a line, yet the arm will be always returned to a position from which it will not commence to move until the wheel has traveled the predetermined units of the line, less, say, thirty-two. The object of the swinging of the arm N is to cause the circuit-closers $N^2$ and $N^3$ to pass over and contact with stationary contacts properly arranged and electrically connected with the magnets controlling the justification-punches, the closer $N^3$ contacting with pins $V^{99}$, connected to the units-punches, and the closer $N^2$ contacting with pins $V^{100}$, connected to the fractions-punches. It will be noticed that the pins $V^{99}$ and $V^{100}$ are arranged in alternate rows, and for distinctness I have shown the pins $V^{99}$ in solid black in Fig. 24, while the open circles illustrate the pins $V^{100}$. It will be noticed that the pins are arranged in circular rows coincident with the pivot of the arm and that there are twelve rows of units-pins and twelve rows of fractions-pins. The electrical connections between each of the pins and the units and fractions punches are shown in tabular form in Fig. 40. Each pair of the pins (the upper and lower pins constituting a pair) represents a space between the words of the line of character-perforations, and I have therefore provided the machine with means for moving the end of the arm or otherwise causing the immediate or subsequent contact of successive rows of pins $V^{99}$ $V^{100}$ with the contacts $N^3$ $N^2$ whenever the space-key is operated. As hereinbefore explained, it is necessary to divide the remaining space of a line after subtracting the aggregate type units of the characters by the number of spaces already inserted therein in order to ascertain the number of type units to be inserted at each space in order to completely fill the line. In my present machine this division is made by giving to the arm two movements—first, circular, as already described, and, second, a progressive longitudinal extension each time a space-key is operated. These two movements of the arm while sometimes occurring simultaneously are independent, and longitudinal extension will be given to the arm in the illustrated structure even before the same is swung about its pivot. If, for instance, the space-key has been operated four times before the arm is given circular movements, the closers $N^2$ and $N^3$ by reason of the four extensions given to the arm will bear when the circular movements of the arm commence on the fourth row of pins—i. e., the row indicated by an asterisk in Fig. 24. If during the swinging of the arm over the contact-table the space-key is operated, the arm will again be extended, and the closers $N^2$ and $N^3$ will pass over to the fifth row of contacts. The selected instance is given, for example, only as illustrating the selective movements of the arm.

Referring now to Figs. 17, 18, 21, 22, and 23, I have shown a means for giving progressive extensions to the arm N independently of the rotary movements of the units-wheel $M^{18}$. This mechanism comprises the toothed wheel $N^9$, engaging the rack $N^8$ of the arm, said wheel being fast to an axle $N^{11}$, Figs. 18 and 21, to the lower end of which is secured a toothed wheel $N^{12}$, in mesh with and driven by a rack $N^{13}$, formed in the reciprocatory bar $N^{14}$, the opposite side of which is provided with beveled teeth $N^{15}$. Forward movements are given to said bar against the pull of a spring $N^6$, Fig. 21, by means of an electromagnet $N^{19}$, which when energized attracts the armature $N^{20}$, and thereby swings the arm $N^{21}$ against the pull of the spring $N^{22}$. Said arm carries at its outer end a pawl $N^{23}$, which is pressed forward by a spring $N^{24}$, which engages the arm $N^{21}$, and a pin $N^{25}$, which extends a considerable distance above the pawl and is employed for releasing purposes, as hereinafter described. By reference to Fig. 6 it will be seen that the magnet $N^{19}$ is connected electrically with a contact-arm $d^{21}$, operated by a space-key U of the keyboard, the circuit connections being as follows: from generator $J^7$, by wire $J^{15}$, by arm $d^{21}$, by wires $J^{35}$ $J^{37}$ to magnet $N^{19}$, by wire $J^{38}$, wire $J^{39}$, wire $J^{60}$, magnet $J^{61}$, by wire $J^{18}$, wire $J^{19}$, relay $J^{20}$, wires $J^5$ and $J^6$ to generator $J^7$.

Returning to Fig. 21, I have shown a spring-pressed stop $N^{27}$, employed to hold the bar $N^{14}$ in a position to which it has been advanced by the arm $N^{21}$, acting under the influence of the spring $N^{22}$, when the circuit through the magnet is broken. This stop is mounted upon an offset block $N^{30}$ and is provided with a pin $N^{28}$, extending a considerable distance above the pawl, as shown in Fig. 22. A spring $N^{29}$ for holding the pawl in position is wound about the pivot of the pawl, and its opposite ends bear, respectively, against the pin $N^{25}$ and the block $N^{30}$.

I have provided the machine with means which permit the lines of characters to be any desired length or to contain any desired number of type units, whereby the perforated strip may control in a secondary machine the printing, production, or assembling of columns of different widths. This improvement consists in providing a stop, movable to any desired position, whereby the starting-point of the lines of perforations may be shifted as desired. For this purpose I have illustrated in Figs. 17, 18, 24, and 25 a wheel $N^{99}$, adapted to be rotated about the axis of the units-wheel in the direction of the arrow, Fig. 24. Said wheel $N^{99}$ is provided with edge teeth $N^{96}$, corresponding in number to those of wheel $M^{18}$ and engaged by a pivoted stop $N^{97}$, held into yielding engagement with the teeth of the wheel by means of a spring $N^{98}$. Upon the upper face of the wheel $N^{99}$, I form or attach figures or letters constituting a gage, and projecting upwardly from said wheel there is a pin $N^{95}$, against which that part of the pin $M^{100}$ projecting below the units-wheel will be brought when a line is to be started. In order to determine the length of the line, the wheel $N^{99}$ is moved in the direction of the arrow until the figure representing the desired length of line is opposite the point of the stop $N^{97}$. Thus when the wheel is in the position shown in Fig. 24 the machine is adapted to provide the strip with enough perforations representing characters, spaces, and justification to assemble, produce, or print a justified line of two hundred type units. When the units-wheel $M^{18}$ is released, as hereinafter described, the pin $M^{100}$ will be brought back to the pin $N^{95}$, which by reason of its attachment to $N^{99}$ may be shifted to any point desired, thereby changing the starting-point of the line. Underneath the units-wheel $M^{15}$ and above the stop-wheel $N^{96}$ there is a coiled spring $N^{16}$, Figs. 24 and 25, surrounding a fixed block $N^{17}$, one end of the spring being secured to the said block and the other end secured to the units-wheel. By this arrangement the units-wheel is restored to its original position when the pawl $M^{13}$ and stop $M^{101}$ are disengaged from the teeth of the wheel, and the return of said wheel causes a rotation of the wheels $N^9$ $N^{12}$ and a consequent shortening of the arm N to its normal position when the pawl N²³ and stop N²⁷ are disengaged from the rack N¹⁵.

*Restoring, counting, and selecting means.—* The means for effecting the release and restoration of the wheel and arm to normal position will next be described.

Referring to Figs. 17, 18, 19, I have shown an electromagnet O, provided with an armature O', held away from the magnet by a spring O². The armature O' depends from and is connected to a plate O³, provided (see Fig. 19) with slots O⁴, O⁵, O⁶, and O⁷, through which screws pass and which allow the plate O³ to be slid upon the frame. The said plate is also provided with a slot O⁸, through which projects, as shown in Fig. 18, the pin connected to the pawl M¹² for operating the units-wheel. In addition the plate is provided with openings O⁹, O¹⁰, and O¹¹, which permit the plate to slide without interfering with the units-wheel and arm-controlling mechanisms and supports. At O¹² the plate is slightly cut away or nicked, (see Figs. 17 and 19,) and downwardly into this nicked portion projects a pin carried by the spring-stop M¹⁰¹, Fig. 17, which holds the units-wheel in advanced position. Against the forward edge of the plate, as shown in Figs. 17 and 19, rest the pins N²⁵ and N²⁸, Figs. 21, 22, and 23, the former extending upwardly from the pawl N²³, which moves the bar N¹⁴, and the latter extending upwardly from the yielding stop N²⁷, which holds said rack in position.

From the foregoing it will be readily understood that when the magnet O is energized the plate O³ will be drawn forward, and as a result of such movement the pawls M¹³ and N²³ and the stops M¹⁰¹ and N²⁷ will be disengaged from the units-wheel and from the rack N¹⁵, whereupon the spring N¹⁶, Fig. 24, will return the wheel to a position where the pins M¹⁰⁰ and N⁹⁵ abut, this position, as explained, being adjustable, and will also return the arm N to its limit position by causing the wheel N⁹ to engage the rack N⁸ and operate thereon, the rotary movement of the wheel N⁹ being caused by the return of bar N¹⁴ under influence of the spring N⁶.

While the means for releasing and restoring the selector mechanism to normal position may be operated or controlled as desired, I prefer to employ an automatic mechanism under control of the carriage of the type-writing machine and made effective when such carriage is returned for the purpose of beginning a new line of the copy. This mechanism, hereinafter described, closes a circuit through the magnet O and causes the movement of the plate O³.

*Selector-table.—*As hereinbefore explained, the rotary and extensible movements of the arm N⁴ effect the contact of circuit-closers N² N³ with pins representing the units and fractions to be inserted. The value of each pin is shown in Fig. 40, wherein the dark circles represent the units and the light circles represent tenths of fractions, and in said figure I have marked the exact numerical value upon each pin. They are arranged in groups of two, each dark circle being grouped with the lighter circle below it. Each pin, as hereinafter described, is electrically connected to a justification-punch of the same value. Thus each units-pin—say 7—is connected to a corresponding justification-punch—say L⁸—and each fractions-pin—say 6—is connected to a corresponding justification-punch—say L¹⁹. The particular pins just referred to are indicated by arrows in Fig. 40. The pins, it will be observed, are arranged in radial lines and in rows involute from radius of wheel N⁹, each row representing a space between words of a line, and each radial line representing the width of a type unit. It is to be understood that with each operation of character-opening punches the closers carried by the arm will be moved over a corresponding number of groups of pins in the same row, and, further, with each operation of space-opening punches the closers carried by the arm will be moved to the next row of pins while being advanced over a number of groups corresponding to the space. As an instance, let it be supposed that the closers N² and N³ are resting, respectively, upon the pins 7 and 6 (indicated by arrows in Fig. 40,) which will occur when the used space of the line contains seven spaces. If now a key representing a six-unit character be pressed at the keyboard, the closers will be advanced circumferentially over six groups of pins and will rest upon the pins representing six units and eight-tenths of units. A depression of a key representing four units will now cause the closers to rest upon the pins representing six units and two-tenths of units. The operation of the space-key at the keyboard, will now cause the simultaneous extension of the arm, carrying the closers over to the next row of pins, and will sweep the same over three groups of the same, coming to rest upon the pins representing five units and four-tenths of units. As hereinbefore instanced, the arm may not begin to travel over the pins until the units-wheel has reached within thirty-two units of the completion of the line. Ordinarily the operator will not attempt to insert, after commencement of movement of the arm, more than thirty-two units in said line, though frequently this over-insertion will be found necessary, and my preferred selecting device will be found to be useful in such cases.

Referring to Fig. 40, it will be seen that there is one line (that marked O) representing a normal amount of unity for spaces between words—viz., three units. If at the completion of a line the closers N² and N³ should rest upon any group in said line, the corresponding punches 3 and 0 would be operated, and in the secondary machine there would be exactly three units in each space of the line. If, however, the line is not filled, it becomes necessary to increase the width of the spaces in the line, and if the line is more than filled there must be a corresponding reduction in width of the spaces. The normal width being three units, this space must be increased proportionately when the line is unfilled and must be decreased proportionately when the line length is exceeded. In Fig. 40 the lines of pins are numbered from "32" to "0" and from "0" to "12," the former indicating the amount of space which may safely be unused in a line and the latter indicating the greatest excess permitted.

Referring now to Figs. 24, 25, and 26, it will be seen that the table V, which carries the units and fractions pins, is preferably composed of sixteen (16) metallic plates (indicated as $V'$, $V^2$, $V^3$, $V^4$, $V^5$, $V^6$, $V^7$, and $V^8$ and $v'$, $v^2$, $v^3$, $v^4$, $v^5$, $v^6$, $v^7$, and $v^8$) insulated from each other by sheets of hard rubber, for instance. Of these plates, $V'$ to $V^7$ are arranged to be electrically connected with the magnets controlling the punches $L^3$ to $L^9$, representing the units, while the plates $V^8$ and $v'$ to $v^8$ are arranged to be electrically connected with the magnets controlling the punches $L^{13}$ to $L^{21}$, representing the fractions, all as hereinafter explained. In Fig. 26 I have shown a sectional view of the table V on the line 26 26 of Figs. 24 and 40 with the arm so far advanced as to have the closers $N^2$ $N^3$ resting upon the pins indicated as $v^{50}$ and $v^{51}$. In said Fig. 26 I have also indicated at the left-hand side of the figure the value in units or fractions of each of the plates, plate $V^2$, for instance, indicating three units and plate $v^2$ indicating two-tenths of a unit. Each plate may be provided with as many perforations as there are pins in the selector—viz., eight hundred and eight—similar perforations being made in the alternating insulating-plates, and all pins of like value are connected to the same metallic plate. Thus, as shown in Fig. 26, all two-unit pins are connected to plate $V'$, representing two units. Similarly all other units and fractions pins are connected to plates of corresponding value, and where a pin passes through one or more plates without electrical engagement suitable means for insulating the same will be provided, such as a sleeve or tube of vulcanized rubber surrounding the pin. The plates are separately and electrically connected with the punch-magnets, as shown in Fig. 6. For convenience I have provided each plate with a slight extension projecting from the opposite sides of the contact-table V, and by means of screws the wires may be connected at said extensions to the separate plates.

*Selector-table connections.*—The connections of the plates are as follows: (2) $V'$ is connected by wire $V^{11}$ with wire $J^{54}$ and magnet $J^{55}$; (3) $V^2$ is connected by wire $V^{12}$ with wire $J^{52}$ and magnet $J^{53}$; (4) $V^3$ is connected by wire $V^{13}$ with wire $J^{50}$ and magnet $J^{51}$; (5) $V^4$ is connected by wire $V^{14}$ with wire $J^{48}$ and magnet $J^{49}$; (6) $V^5$ is connected by wire $V^{15}$ with wire $J^{46}$ and magnet $J^{47}$; (7) $V^6$ is connected by wire $V^{16}$ with wire $J^{44}$ and magnet $J^{45}$; (8) $V^7$ is connected by wire $V^{17}$ with wire $J^{42}$ and magnet $J^{43}$; (.0) $V^8$ is connected by wire $V^{18}$ with wire $J^{36}$ and magnet $J^{37}$; (.1) $v'$ is connected by wire $v^{11}$ with wire $J^{34}$ and magnet $J^{35}$; (.2) $v^2$ is connected by wire $v^{12}$ with magnet $J^{33}$; (.3) $v^3$ is connected by wire $v^{13}$ with wire $J^{30}$ and magnet $J^{31}$; (.4) $v^4$ is connected by wire $v^{14}$ with magnet $J^{29}$; (.5) $v^5$ is connected by wire $v^{15}$ with wire $J^{26}$ and magnet $J^{27}$; (.6) $v^6$ is connected by wire $v^{16}$ with magnet $J^{25}$; (.7) $v^7$ is connected by wire $v^{17}$ with wire $J^{22}$ and magnet $J^{23}$; (.8) $v^8$ is connected by wire $v^{18}$ with magnet $J^{17}$.

*Operation of the selected means.*—Whenever, therefore, the closers $N^2$ and $N^3$ at the end of the arm N are in contact with a pair of pins of the table V, the magnets connected with said pins will be energized when current is sent over the lines selected. This in the present case occurs upon and during the restoration of the type-writer carriage at the end of a line. The electrical circuits closed in such case are shown in Fig. 6 and are as follows: from generator $J^7$, by wire $J^{15}$, through the bar of circuit-closers D, by wire $J^{13}$ to wires $J^{95}$ and $J^{96}$, through the units-line contacts $J^{99}$ $J^{100}$ and fractions-line contacts $J^{97}$ $J^{98}$, by wires $J^{75}$ and $J^{94}$, respectively, to the circuit-closers $N^3$ $N^2$ of arm N, and thence by the selected pins, wires, and magnets to wires $J^{18}$ $J^{19}$, relay $J^{20}$, and wires $J^5$ and $J^6$ to generator $J^7$. It is obvious that the said circuits will not be closed until the contacts $J^{99}$ and $J^{100}$ of the units-line are in engagement, as are also the contacts $J^{97}$ and $J^{98}$, though other means for closing the circuits may be employed. Preferably, however, the closing of the circuits at $J^{99}$ and $J^{100}$ and at $J^{97}$ and $J^{98}$ will be under the engagement of the armature of an electromagnet. For this purpose I employ the armature of the line-trip magnet $J^{71}$, Figs. 6 and 9. In this latter figure I have shown the armature of said line-trip magnet as carrying an insulating-block which is provided with contacts $J^{100}$ and $J^{98}$. The arrangement, shape, mounting, and connection of these contacts may be like those of $J^{11}$ shown in Fig. 8 and already described. Upon energizing the electromagnet $J^{71}$ the contacts $J^{100}$ and $J^{98}$ are brought, respectively, into engagement with the contacts $J^{99}$ and $J^{97}$. (Shown in Fig. 6.) The line-trip magnet $J^{71}$ is in circuit with and under control of a means carried by the type-writer carriage, as hereinafter explained, and upon the operation of said means the circuit is closed (see Fig. 6) by way of wires $J^{15}$ $J^{18}$, carriage-controlled closer P, wire $J^{70}$, magnet-wire $J^{72}$ to generator $J^7$. As hereinbefore explained, the operation of the armature of the line-trip magnet $J^{71}$ closes the units-line and fractions-line of the selecting means, resulting in the operation of the selected justification-punches, and the energizing of the relay J²⁰ closes the circuit through the guide-hole magnets S and S'. Thus as a consequence of the operation of the carriage-controlled device P the line-trip punch L¹², the selected justification-punches, and the guide-punches L' and L²² are all operated practically simultaneously. As hereinbefore explained, the space-trip punch L² is also operated at the same time.

Hereinbefore I have stated that simultaneously with the operation of the guide-hole punches one of the armatures for operating the same (armature T', Figs. 6 and 8) closes a circuit through the winding-magnet H and the magnet M, which controls the advance of the units-wheel. Inasmuch, however, as it is essential that the arm N of the selecting device shall be at rest while current is traversing the units-line and fractions-line and the selected pins the magnet M must be cut out of circuit momentarily; otherwise the units-wheel if energized without stops being interposed would be moved six units while the punch-magnets are being energized, and the shifting of the arm would cause the closers N² and N³ to pass over six groups of pins of the contact-table V and in all probability cause the operation of a number of justification-punches, rendering the strip useless for justification purposes. The short-circuiting of magnet M, which prevents this undesirable result, is accomplished by the addition to the carriage-controlled device P of means for diverting the current, after passing through the coils of the winding-magnet H, over wires J⁶⁵ and J⁹⁰ to the wire J⁶.

*Restoring devices.*—I have also provided the machine with means operated by the type-writer carriage for causing the restoration, by the means already described, of all parts of the selector mechanism to the predetermined position, the magnet O being energized for this purpose. Accordingly the carriage is provided with a contact which upon the movement of the carriage for a new line closes a circuit through magnet O, and the mechanical connections are so arranged that the last-named circuit is not closed until after the closing and breaking of the circuits through the justification-punches and through the space-trip and line-trip magnets, assuring the complete and satisfactory operation of those parts before the restoration of the parts of the selecting device for normal position. In addition thereto I have shown means whereby the circuit through the restoring-magnet O will be maintained closed for a comparatively long time, thus giving ample opportunity for the springs N¹⁶ and N⁶ to pull the arm N and units-wheel M¹⁸ to normal position. The carriage and the devices for controlling and restoring the parts referred to are shown in Figs. 32, 33, 34, 35, 36, and 37. Referring to these figures, C' indicates the frame of the carriage, and C² the platen thereof. C³ indicates the bar upon which the carriage is pivoted in order that the "copy" may be examined. C⁴ is the slide upon which the carriage is fixed, said slide being mounted on antifriction-bearings. I clamp two strips C⁵ of metal, to which are attached spring-clips C⁶ C⁶, which frictionally engage (see Fig. 36) opposite sides of a metallic bar C⁷, capable of slight reciprocating movement in guides comprising slots C⁸, through which fit screws C⁹. Upon the return of the carriage, as indicated by the arrow of Fig. 32, the clips C⁶ grip the bar C⁷ and carry it forward until the end of the slot reaches the screw C⁹, whereupon during any continued movement of the carriage the clips will slip along the bar, and upon the release of the carriage and return of same under the influence of the spring-drum or other device the clips will draw the bar C⁷ to its most rearward position. Thus each return of the carriage, however slight, advances the bar, and each forward movement of the carriage restores the bar. When I employ a "Caligraph" or a Remington type-writer, the settling of the carriage to position after bringing the pointer to the desired number on the scale will accomplish the return of the bar.

*Carriage-contacts.*—Near the forward end of the bar C⁷, I have attached the upper end of a strip C¹⁰, which is bent inwardly and provided with a slot C¹¹ for engaging a screw C¹² or other projection attached to a short sliding bar C¹³. To this latter bar there is fastened a trip C¹⁴—a strip of metal having its upper part free of the bar bent parallel with the upper surface of the bar C¹³.

C¹⁵ is a pin extending rearwardly from a block P, pivoted at C¹⁷ and projecting through a curved slot C¹⁸ in the plate C¹⁹, which supports the block P. The said pin projects between the arms of a pivoted spring C²⁰, mounted upon the front of C¹⁹. The pivoted block P carries contacts P⁴ P⁵ P⁶, (see especially Fig. 33,) the first of which is connected to a wire J⁹⁰, Fig. 6, being insulated from the block P by insulation P', Fig. 33, and the latter two being directly mounted upon the block P, which is connected to wire J¹³, Fig. 6. Fastened to the plate C¹⁹ is a block P⁷ of insulant or insulated from C¹⁹, and to the block there are secured three separate contacts P' P² P³, which, as shown in Fig. 6, are connected, respectively, to the space-trip magnet J⁶¹, the line-trip magnet J⁷¹, and to the wire J⁶⁵, which cuts out the counting-magnet M, while maintaining the winding-magnet H in circuit. The circuits referred to are closed when the pivoted block P is swung bringing P⁶ against P', P⁵ against P², and P⁴ against P³. This movement of the block is accomplished by the advance of the short bar C¹³, the trip C¹⁴ engaging the projection C¹⁵ and forcing the block to contacting position, with the forward arm of spring C²⁰ under strain. The continuation of the advance of the bar carries the trip past the projection C¹⁵, whereupon the spring will throw the block P back to open-circuit position, the several devices above mentioned being thus cut out of circuit. The screw C¹², hereinbefore referred to, is provided with a contact C²¹, Figs. 6, 33, 34, 35, and said screw is adapted to have free movement in a slot C²², formed through plate C¹⁹. The advancing movement of the bar C¹³ will continue until the contact C²¹ comes against a contact C²³, fixed to the plate C¹⁹. This will close, as shown in Fig. 6, the circuit through the restoring-magnet O, which permits the parts of the selector to be returned to normal. The contacts C²¹ and C²³ having been brought together, any further movement of the carriage C⁴ will cause the friction device C⁶ to slip along the bar C⁷, and immediately upon the cessation of the carriage movement the contacts C²¹ and C²³ will be separated by the setting-back movement of the type-writer carriage. By the arrangement described the return movement of the carriage, however slight, closes the circuits at P momentarily, and the continuation of the movement closes the circuit through the magnet O and maintains said circuit closed for a comparatively long time.

*Signal.*—I have provided the machine with means for indicating to the operator when a line is nearly filled, said means being arranged to preferably close a circuit through an incandescent lamp Q, Figs. 1 and 26. The illustrated apparatus includes (see Figs. 24, 25, and 26) a lamp Q, a leading-in wire Q', an outgoing wire Q², connected to a circuit-closer consisting of a frame Q³ and elastically-pressed contact Q⁵, the closer being mounted upon the extensible arm N, while insulated therefrom by a non-conducting base Q⁴. Situated above the arm N there is a plate Q⁶, against the under side of which the contact Q⁵ presses when the arm N has been advanced by the spacing devices. A wire Q⁷ connects said plate to the source of current. Preferably the plate Q⁶ coincides in shape with the arrangement of contacts on the table V as shown in Fig. 24, by which means I am assured the contact Q⁵ shall not press against the plate until or unless the circuit-closers N² N³ of arm N are in contact with the pins, insuring a continuous signal during the possible period of justification.

Hereinbefore I have mentioned only the use of the machine when a strip is to be provided with perforations representing completely-filled lines of characters. It is obvious, however, that the machine may be adapted to produce controllers for setting up, casting, or printing indented lines or other short lines and that the accomplishment of this result will be of the greatest importance.

*Indentation.*—For the indented lines I have provided a special key Y, Fig. 2, which pressing upon proper wires X closes a circuit at d² and by wire J⁸, magnet M, wire J⁶⁴, and wire J⁵ to the generator J⁷. Inasmuch as the counting-magnet M is the only one included in circuit, upon the operation of the indent-key the wheel M¹³ will be moved forward six units, no stops having been interposed. It will be noticed also that the arm N is not lengthened upon the operation of the indent-key.

*End of paragraphs.*—In the second case of short lines—i. e., those comprised in short sentences or conclusions of paragraphs—I provide a key R, Fig. 2, known as a "line-finishing" key, which pulls proper wires X to operate closers d¹² and d²², resulting in the energizing of the space-trip magnet J⁶¹ and the energizing of magnet J³⁹ and by the closing of relay J²⁰ the energizing of the guide-hole-punching magnets H and M. The arm-magnet N¹⁹ is not energized during the operation of the line-finishing key.

While I have shown and described electrically-operated devices, it will be understood that my invention is not necessarily confined thereto. Other forces, if power is availed of, may be used. Because, however, of the ease and economy of connection and maintenance and durability and reliability of the apparatus, I prefer to use electricity.

I am aware that it is not new to employ in a machine for perforating controller-strips means such as a dial or a cylinder to inform the operator which key or keys he must thereafter manually operate in order to provide the strip with perforations intended to effect the justification of a line of characters or types; but I am not aware that such a machine has ever been provided with a device which exclusively selects the particular punch or punches required to be operated to effect the desired justification, nor am I aware that a machine for perforating controller-strips has ever prior to my invention been provided with means whereby the particular punch or punches required to perforate the strip to effect the exact justification of a line of characters are automatically operated at the end of the representations of a line of characters.

By my improvements accuracy is assured in the selection and operation of the required punch or punches, and the operations are automatically performed. It is not necessary for the operator to read a dial or cylinder and to thereafter operate one or more keys, either of which things he may neglect to do or he may err in reading the dial or cylinder or in operating the proper key or keys.

The illustrated means for automatically operating the selected punch or punches is under the operation of the carriage of the type-writing machine. By this arrangement the selected punch or punches may be operated directly by the return of the carriage; but, if desired, a key, button, or other device may be used for the purpose desired and may also control the return of the carriage, if one be used.

My new machine, especially in the preferred and illustrated form, may be very advantageously employed for controlling machines for printing justified lines, especially upon transfer-sheets intended for use in surface printing. If desired, however, the perforated controller-strip may be employed to control machines for casting and assembling lines of type or to control machines for setting lines of type.

The operation of the form of machine illustrated in the accompanying drawings is as follows: The compositor depresses the keys B of the keyboard, and the successive operations of these keys cause the closing of successively different combinations of contacts at D with the operations of corresponding punches L, and by means of the contacts $J^{11}$ $J^{12}$ the counting and paper-feeding magnets M and H are energized. The first named of these operates the counting-wheel $M^{18}$ as permitted by the stops interposed by the operation of the punches. As the counting-wheel approaches the limit of its travel it engages and operates the arm N, which irrespective of the movements of the counting-wheel has been lengthened as the result of depressions of the space-bar U, the operations of which close a circuit through a magnet $N^{19}$ and cause movements of the lever $N^{21}$. The longitudinal and sweeping movements of the arm N are thus independent of each other. Continuing its operation the counting-wheel moves the arm from set to set of the pins projecting from the contact-table V until the compositor decides that the line is sufficiently full, and thereupon the carriage is returned to its original position. This, as hereinbefore explained, among other things results in closing a circuit through the line-trip magnet $J^{71}$, the armature of which closes circuits at $J^{98}$ and $J^{100}$ through the particular units and fractions pins upon which the contacts $N^2$ and $N^3$ (at the extremity of the arm N) then rest and by way of these pins to the magnets controlling the punches necessary to provide the pattern with the proper justification-openings. The continuation of the return movement of the carriage breaks the line-trip contact and next closes a circuit through the magnet O, the armature of which carries a plate $O^3$, which releases the pawls $N^{23}$, $N^{27}$ $M^{101}$, and $M^{18}$, and the springs $N^6$ and $N^{16}$ restore the counting-wheel and arm to predetermined position.

While I have herein described and shown one form of machine embodying my several improvements and found by me to be exceedingly practical, yet I do not desire to be understood as confining my invention thereto. Obviously many modifications which will be within the scope of my claims will readily suggest themselves to persons skilled in the art.

I claim—

1. In a machine for producing controller-patterns, the combination of means for providing the pattern with character-selecting representations, means for automatically selecting the amount of justification required at the completion of a line of such character-selecting representations, and means for automatically operating said selected justifying means, substantially as described.

2. In a machine for producing controller-patterns, the combination of means for providing the pattern with character-selecting representations, means for automatically selecting the amount of justification required at the completion of a line of such character-selecting representations, and means for automatically operating said selected justifying means to provide the pattern with representations of the selected justification at the completion of the line, substantially as described.

3. In a machine for producing controller-patterns, the combination of means for providing the pattern with character-selecting representations, means for automatically selecting the amount of justification required at the completion of a line of such character-selecting representations, and means for automatically operating said selected justifying means upon the further operation of the machine, substantially as described.

4. In a machine for producing controller-patterns, the combination of means for providing the pattern with character-selecting representations, means for positively selecting the mechanism for justification required at the completion of a line of such character-selecting representations, and means for automatically completing the action of the last-named mechanism, substantially as described.

5. In a machine for producing controller-patterns, the combination of means for providing the pattern with character-selecting representations, means for positively selecting the mechanism for justification required at the completion of a line of such character-selecting representations, and means for automatically putting in operation the selected justification mechanism, substantially as described.

6. In a machine for producing controller-patterns, the combination of means for providing the pattern with character-selecting representations, means for automatically selecting the amount of justification required at the completion of a line of such character-selecting representations, means for automatically providing the pattern with representation of the completion of the said line, and means, operated by that last named, for operating the selected justifying means, substantially as described.

7. In a machine for producing controller-patterns, a key-operated mechanism having a movable carriage arranged to be restored to initial position, in combination with means for providing the pattern with perforations representing the justification of a line of characters, and with connections, operated by the restoration of the carriage, for operating the perforating means aforesaid, substantially as described.

8. In a machine for producing controller-patterns, a key-operated mechanism having a movable carriage, in combination with means for providing the pattern with perforations representing the justification of a line of characters, and with connections, controlled by the carriage, for operating the perforating means, substantially as described.

9. In a machine for producing controller-patterns, devices for providing a pattern with representations of a line of characters, movable means and connections for selecting one or more of the said devices to provide the pattern with representations of the justification of the line of characters, means for automatically operating the selected device or devices, and means for restoring the selecting means to initial position, substantially as described.

10. In a machine for producing controller-patterns, devices for providing a pattern with representations of a line of characters, movable means and connections for selecting one or more of said devices to provide the pattern with representations of the justification of the line of characters, means for automatically operating the selected device or devices, and automatically-operating means for restoring the selecting means to initial position, substantially as described.

11. In a machine for producing controller-patterns, movable means for selecting the device or devices which operate upon a pattern to represent the justification of a line of characters, and means, controlled by an electromagnet, for restoring the selected means to initial position, substantially as described.

12. In a machine for producing controller-patterns, movable means, for selecting the device or devices which operate upon a pattern to represent the justification of a line of characters, and means, including a spring or springs, and controlled by an electromagnet, to restore the selecting means to initial position, substantially as described.

13. In a machine for producing controller-patterns, a unitary device for determining the justification of a line of characters, and for positively selecting the device or devices to be operated for the representation of the determined justification, substantially as described.

14. In a machine for producing controller-patterns, a unitary device for determining the justification of a line of characters, and for positively selecting the device or devices to be operated for the representation of the determined justification, with means for returning the unitary device to initial position, substantially as described.

15. In a machine for producing controller-patterns, a unitary device for determining the justification of a line of characters, and for positively selecting the device or devices to be operated for the representation of the determined justification, with means for operating the selected device or devices, substantially as described.

16. In a machine for producing controller-patterns, a device for determining the justification of a line of characters, and means, positively controlled by said device for moving the device or devices to be operated to represent the determined justification, substantially as described.

17. In a machine for producing controller-patterns, a device for determining the justification of a line of characters, contacts carried by said device, other contacts in the path of those on the determining device, electromagnets connected with the last-named contacts, and devices, under control of the electromagnets, for operating upon the pattern to represent the determined justification, substantially as described.

18. In a machine for producing controller-patterns, devices for providing a pattern with representations of a line of characters, means for selecting one or more of said devices to provide the pattern with representations of the justification of the line of characters, and means, positively controlled by the selecting means, for operating the selected device or devices, substantially as described.

19. In a machine for producing controller-patterns, devices for operating upon a pattern to represent the justification of a line of characters, an arm provided with contacts for selecting the device or devices to be operated to represent a given amount of justification, and electromagnets in circuit therewith controlling the operation of the selected device or devices, substantially as described.

20. In a machine for producing controller-patterns, devices for operating upon a pattern to represent the justification of a line of characters, electromagnets for controlling the operation of the said devices, and automatically-operating means for closing the desired circuit or circuits, substantially as described.

21. In a machine for producing controller-patterns, a device for operating upon a pattern to represent the end of a line of characters, and means for automatically operating said device at the conclusion of said line of characters, substantially as described.

22. In a machine for producing controller-patterns, a device for operating upon a pattern to represent the end of a line of characters and devices for operating practically simultaneously upon the pattern to represent the justification of the said line, and means for automatically operating both classes of devices, substantially as described.

23. In a machine for producing controller-patterns, a device for operating upon a pattern to represent the end of a line of characters, a key-operated mechanism provided with a movable carriage, and means, controlled by the carriage, for operating the said device, substantially as described.

24. In a machine for producing controller-patterns, devices for operating upon a pattern to represent the justification of a line of characters, means for positively selecting the device or devices to be operated, and means, controlled by a spacing mechanism, for changing the position of the selecting means, substantially as described.

25. In a machine for producing controller-patterns, devices for operating upon a pattern to represent the justification of a line of characters, an arm of variable length for positively selecting the device or devices to be operated, and an electromagnet and connections, controlled by a spacing mechanism, for varying the length of the said arm, substantially as described.

26. In a machine for producing controller-patterns, devices for operating upon a pattern to represent the justification of a line of characters, an arm of variable length for positively selecting the device or devices to be operated, means, controlled by a spacing mechanism, for varying the length of the said arm, and means, controlled by the arm, for automatically operating the selected justifying device or devices, substantially as described.

27. In a machine for producing controller-patterns, devices for operating upon a pattern to represent the justification of a line of characters, an arm of variable length for selecting the device or devices to be operated, means, controlled by a spacing mechanism, for varying the length of said arm, a plurality of contacts, in the path of the movement of the arm, and electromagnets electrically connected with the contacts, and controlling the operation of the selected device or devices, substantially as described.

28. In a machine for producing controller-patterns, devices for operating upon a pattern to represent the justification of a line of characters, an arm for selecting the device or devices to be operated, a plurality of contacts in the path of movement of the arm, and electromagnets electrically connected with the contacts, and controlling the operation of the selected device or devices, substantially as described.

29. In a machine for producing controller-patterns, devices for operating upon a pattern to represent the justification of a line of characters, an arm for selecting the device or devices to be operated, contacts in the path of said arms, arranged in a plurality of rows, means for moving the arm over the contacts and from row to row thereof as desired, and electromagnets electrically connected with the contacts and controlling the operation of the selected device or devices, substantially as described.

30. In a machine for producing controller-patterns for the purposes specified, devices for operating upon a pattern to represent the justification of a line of characters, an arm of variable length for positively selecting the device or devices to be operated, means, controlled by the spacing mechanism, for varying the length of the arm, and means for automatically restoring the arm to its normal length, substantially as described.

31. In a machine for producing perforated controller-strips for the purposes specified, key-operated mechanism, provided with a movable carriage, punches for providing the strip with perforations representing the justification of a line of characters, a movable device for selecting the punch or punches desired, and means, controlled by the aforesaid carriage for operating the selected punch or punches, and subsequently restoring the selecting device to initial position, substantially as described.

32. In a machine for producing perforated controller-strips for the purposes specified, key-operated mechanism, provided with a movable carriage, punches for providing the strip with perforations representing the justification of the line of characters, a movable device for selecting the punch or punches desired, a punch for providing the strip with a perforation determining the end of the line, and means, controlled by the aforesaid carriage, for operating the determining-punch and the selected punch or punches for the justification, and for subsequently restoring the selecting device to initial position, substantially as described.

33. In a machine for producing perforated controller-strips for the purposes specified, key-operated mechanism provided with a movable carriage, punches for providing the strip with perforations representing the justification of a line of characters, a movable device for selecting the punch or punches desired, electromagnets and connections controlling the operation of the selected punch or punches, an electromagnet and connections for restoring the selecting device to initial position, and circuit-closers, connected with the carriage aforesaid and operating successively to first energize the magnet or magnets controlling the selected punch or punches for the justification, and to subsequently energize the magnet controlling the restoring means for the selecting device, substantially as described.

34. In a machine for producing controller-patterns for the purposes specified, key-operated mechanism provided with a movable carriage, circuit-closers connected, by frictional gripping means, with the carriage aforesaid, electrical conductors from the circuit-closers, magnets in circuit with said conductors and one or more punches and operating connections therefor under control of said magnets, substantially as described.

35. In a machine for producing controllers for the purposes specified, a plurality of punches for providing a strip with character-openings and space-openings, movable stops under control of punches included in those mentioned, and a movable counting device whose length of movement is varied by the interposition or absence of one of the movable stops, substantially as described.

36. In a machine for producing controllers for the purposes specified, a plurality of punches for providing a strip with character-openings and space-openings, some of said punches being provided with attached plates, movable stops engaging and operating with said plates, and a reciprocatory bar, whose length of stroke is varied by the interposition or absence of one of the movable stops, substantially as described.

37. In a machine for producing controllers for the purposes specified, a plurality of punches for providing a strip with character-perforations and space-perforations, some of said punches being arranged in groups in accordance with the groups of type-width units represented, a selector for selecting the punch or punches for effecting justification of the line of characters, and a variable-stroke device for operating the selector and having a length of stroke controlled by the groups of punches aforesaid, substantially as described.

38. In a machine for producing controllers for the purposes specified, a plurality of punches for providing a strip with character-perforations and space-perforations, some of said punches being arranged in groups in accordance with the groups of type-unit widths represented, a rotary device, a selector operated thereby and selecting the punch or punches for effecting justification of a line of characters, a variable-stroke device for operating the rotary devices and having the length of stroke controlled by the groups of punches aforesaid, substantially as described.

39. In a machine for producing controllers for the purposes specified, a plurality of punches for providing a strip with character-openings and space-openings, some of said punches being arranged in groups in accordance with the group of type-unit widths represented, a selector, capable of longitudinal extension, for selecting the punch or punches for effecting justification of a line of characters, a variable-stroke device for operating the selector, and having the length of stroke controlled by the groups of punches aforesaid, and means for extending the selector as desired, substantially as described.

40. In a machine for producing controllers for the purposes specified, a plurality of punches for providing a strip with character-openings and space-openings, some of said punches being arranged in groups in accordance with the groups of type-unit widths represented, a selector, arranged for reciprocation, for selecting the punch or punches for effecting justification of a line of characters, a variable-stroke device for operating the selector, and having the length of stroke controlled by the groups of punches aforesaid, and means for imparting reciprocation to the selector as desired, substantially as described.

41. In a machine for producing controllers for the purposes specified, a plurality of punches for providing a strip with character-openings and space-openings, some of said punches being provided with attached plates, movable stops engaging and operating with said plates, a reciprocatory bar, whose length of stroke is varied by the interposition or absence of one of the movable stops, and a rotary device engaged and operated by the bar, substantially as described.

42. In a machine for producing controllers for the purposes specified, a plurality of punches for providing a strip with character-openings and space-openings, a reciprocatory bar having a variable length of stroke, a rotary device engaged and operated by the bar, movable stops for varying the length of stroke of the bar, and operating connections between punches and the movable stops, substantially as described.

43. In a machine for producing controllers for the purposes specified, a plurality of punches for providing the strip with character-openings and space-openings, a variable-stroke device and a rotary device engaged and operated thereby, and means, operated by the punches, for controlling the length of stroke of said device, substantially as described.

44. In a machine for producing controllers for the purposes specified, a plurality of punches for providing a strip with character-openings and space-openings, one or more punches for providing the strip with guide-openings, and a justification-selector controlled by the devices for operating the guide-opening punch or punches, substantially as described.

45. In a machine for producing controllers for the purposes specified, a plurality of punches for providing a strip with character-openings and space-openings, one or more punches for providing the strip with guide-openings, a justification-selector, electromagnetic devices for operating the same, and means, controlled by the devices for operating the guide-opening punch or punches, for placing the electromagnetic devices in circuit, substantially as described.

46. In a machine for producing controllers for the purposes specified, a plurality of punches for providing the strip with character-openings and space-openings, one or more punches for providing the strip with guide-openings, a device for feeding the paper to be punched, and means, controlled by the guide-opening punch or punches, for operating the paper-feed, substantially as described.

47. In a machine for producing controllers for the purposes specified, a plurality of punches for providing the strip with character-openings and space-openings, one or more punches for providing the strip with guide-openings, a paper-feed, electromagnetic devices for operating the same, and means, controlled by the devices for operating the guide-opening punch or punches, for placing the electromagnetic devices in circuit, substantially as described.

48. In a machine for producing controllers for the purposes specified, a plurality of punches for providing the strip with character-openings and space-openings, one or more punches for providing the strip with guide-openings, a device for feeding the paper to be punched, electromagnetic devices for controlling the same, a justification-selector, electromagnetic devices for controlling the selector, and means, controlled by the devices for operating the guide - opening punch or punches, for placing the electromagnetic devices aforesaid in circuit, substantially as described.

49. In a machine for producing controllers, for the purposes specified, a plurality of punches for providing the strip with openings representing the justification of a line of characters; means for operating the desired punch or punches, a punch for providing the strip with a "line-trip" opening; and unitary means for operating the "line-trip" punch and for controlling the operation of the justification-punches, substantially as described.

50. In a machine for producing controllers for the purposes specified, a plurality of punches for providing the strip with openings representing the justification of a line of characters; electromagnets for operating the desired punch or punches; a punch for providing the strip with a "line-trip" opening; and means for operating the "line-trip" punch and for closing contacts in the circuits which include the electromagnets, substantially as described.

51. In a machine for producing controllers for the purposes specified, a plurality of punches for providing a strip with character-openings, one or more punches for providing the strip with guide-openings, counting mechanism, and connections whereby the operation of the counting mechanism is controlled by the devices which operate the guide-opening punches, substantially as described.

52. In a machine for producing controllers for the purposes specified, a plurality of punches for providing a strip with character-openings, one or more punches for providing the strip with guide-openings, connections whereby the operation of the guide-opening punches is controlled by the devices which operate the character-opening punches, and counting mechanism and connections whereby the operation of the counting mechanism is controlled by the devices which operate the guide-opening punches, substantially as described.

53. In a machine for producing controllers for the purposes specified, a plurality of punches for providing a strip with character-openings, one or more punches for providing the strip with guide-openings, counting mechanism and connections whereby the said devices will operate successively and in the order stated, substantially as described.

54. In a machine for producing controllers for the purposes specified, one or more punches for providing a strip with guide-openings, counting mechanism, and connections whereby the said devices will operate successively and in the order stated, substantially as described.

55. In a machine for producing controllers for the purposes specified, one or more punches for providing a strip with guide-openings, counting mechanism, connections whereby the said devices will operate successively and in the order stated, and means for deferring the operation of the counting mechanism until the completion of the punching operations, substantially as described.

56. In a machine for producing controllers for the purposes specified, a plurality of punches for providing a strip with character-openings, one or more punches for providing the strip with guide-openings, a mechanism for winding the punched strip, and means controlled by the devices for operating the last-named punches for deferring the operation of the winding mechanism until the completion of the punching operations, substantially as described.

57. In a machine for producing controllers for the purposes specified, one or more punches for providing a strip with guide-openings, a device or devices for operating the punch, or punches; a mechanism for winding the punched strip, an electromagnet for controlling the operation of the winding mechanism, and means, controlled by the device or devices which operate the guide - opening punches, for making and breaking the circuit through the electromagnet aforesaid, substantially as described.

58. In a machine for producing controllers for the purposes specified, one or more punches for providing a strip with guide-openings, a device or devices for operating said punch or punches; a roll for receiving the punched strip; a mechanism for winding the strip thereon, and comprising a step-by-step device operated by a spring and set for operation by an electromagnet, and means, controlled by the device or devices which operate the guide-opening punches, for making and breaking the circuit through the electromagnet aforesaid, substantially as described.

59. In a machine for producing controllers for the purposes specified, a counting mechanism, movable means for selecting the device or devices which operate upon a pattern to represent the justification of a line of characters, and connections whereby the selecting means will be operated directly by the counting mechanism during the concluding movements thereof, substantially as described.

60. In a machine for producing controllers for the purposes specified, a counting mechanism, movable means for selecting the device or devices which operate upon a pattern to represent the justification of a line of characters, connections whereby the selecting means will be operated directly by the counting mechanism during the concluding movements thereof, and means for restoring the counting mechanism and the selecting means to normal position, substantially as described.

61. In a machine for producing controllers for the purposes specified, a counting mechanism, devices to operate upon a pattern to represent the justification of a line of characters, electromagnets controlling the operation of said devices, and means, moved by the counting mechanism, for selecting the justifying devices, and operating to place the desired electromagnets in circuit to be energized, substantially as described.

62. In a machine for producing controllers for the purposes specified, a counting mechanism, and means, moved by the counting mechanism, for selecting the devices which operate upon a pattern to represent the justification of a line of characters, substantially as described.

63. In a machine for producing controllers for the purposes specified, a counting mechanism, means moved by the counting mechanism for selecting the devices which operate upon a pattern to represent the justification of a line of characters, and connections whereby, upon the operation of a space-key, the selecting device will be moved independently of the movement by the counting mechanism, substantially as described.

64. In a machine for producing controllers for the purposes specified, a plurality of punches for providing a strip with openings representing character and space selection, devices for operating upon a pattern to represent the justification of a line of characters, means for selecting the desired device or devices, said means having a variable range of movement dependent upon the number of characters and spaces of a line, and a signaling device constantly in operation during the justification range of the selecting means and irrespective of the position thereof, substantially as described.

65. In a machine for producing controllers for the purposes specified, a plurality of punches for providing a pattern with perforations representing character selection, and automatically-operating means for selecting and operating the said punches in different combinations for providing the pattern with perforations representing justification of the line of characters, substantially as described.

66. In combination with a machine for producing controller-patterns, devices to operate upon a pattern to represent justification of a line of characters, and automatic power connections for operating the device or devices required to operate upon the pattern to represent a given amount of justification, substantially as described.

67. In combination with a machine for producing controller-patterns, devices to operate upon a pattern to represent justification of a line of characters, electromagnets and connections for operating said devices, and automatically-operating means for energizing the magnet or magnets controlling the device or devices required to be operated upon the pattern to represent a given amount of justification, substantially as described.

68. In combination with a machine for producing controller-patterns, devices to operate upon a pattern to represent justification of a line of characters, electromagnets and connections for operating said devices, means for automatically including in circuit the magnet or magnets controlling the device or devices required to operate upon the pattern to represent a given amount of justification, and means for automatically energizing the magnet or magnets included as aforesaid, substantially as described.

69. In combination with a machine for producing controller-patterns, justification devices arranged to operate upon a pattern to represent justification of a line of characters, electromagnets and connections for operating said devices, means for selecting the justification devices, said means including a plurality of contacts connected to each of said magnets, a keyboard, a circuit-closing device, and connections controlled by the keyboard for moving the circuit-closing device over the contacts aforesaid, substantially as described.

70. In combination with a machine for producing controller-patterns, justification devices arranged to operate upon a pattern to represent justification of a line of characters, electromagnets and connections for operating said devices, means for selecting the justification devices comprising a selector-table having a plurality of conductive plates each of which is connected with one of the electromagnets aforesaid and each of which is provided with a plurality of conductive projections, a keyboard, a circuit-closing device, and connections controlled by the keyboard for moving the circuit-closing device over the projections aforesaid, substantially as described.

71. In combination with a machine for producing controller-patterns, justification devices to operate upon a pattern to represent justification of a line of characters, electromagnets and connections for operating said devices, means for selecting the justification devices comprising a plurality of superimposed conductive plates each connected with one of the electromagnets aforesaid, each of which is provided with a plurality of conductive projections which pass upwardly through other plates, a keyboard, a circuit-closing device and connections controlled by the keyboard for moving the circuit-closing device over the projections of the said plates, substantially as described.

72. In combination with a machine for producing controller-patterns, justification devices to operate upon a pattern to represent justification of a line of characters, electromagnets and connections for operating said devices, means, for selecting justification devices, including a selector-table containing a plurality of superimposed conductive plates each connected with one of the electromagnets aforesaid, and separated from each other by interposed insulation, each of the conductive plates being provided with a plurality of conductive projections which pass upwardly through the remaining conductive plates and insulating-plates, a keyboard, a circuit-closing device, means controlled by the keyboard for moving the circuit-closing device over the projections aforesaid, substantially as described.

73. In combination with a machine for producing controller-patterns, justification devices to operate upon a pattern to represent justification of a line of characters, electromagnets and connections for operating said devices, means, for selecting justification devices, including a plurality of contacts connected to corresponding electromagnets and arranged at the surface of the selecting device in rows, a keyboard, a circuit-closing device, and connections controlled by the keyboard for moving the circuit-closing device over the rows of contacts aforesaid, substantially as described.

WALTER S. TIMMIS.

Witnesses:
WM. H. BERRIGAN, Jr.,
JAMES J. COSGROVE.